(12) United States Patent
Abe

(10) Patent No.: US 9,483,716 B2
(45) Date of Patent: Nov. 1, 2016

(54) IMAGE FORMATION DATA GENERATING DEVICE AND METHOD FOR GENERATING IMAGE FORMATION DATA OF SIMULTANEOUSLY DISPLAYED IMAGES

(71) Applicant: Sachiko Abe, Kanagawa (JP)

(72) Inventor: Sachiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/334,380

(22) Filed: Jul. 17, 2014

(65) Prior Publication Data

US 2014/0327933 A1     Nov. 6, 2014

Related U.S. Application Data

(63) Continuation of application No. 13/422,602, filed on Mar. 16, 2012, now Pat. No. 8,803,890.

(30) Foreign Application Priority Data

Mar. 18, 2011  (JP) .................................. 2011-061518
Jan. 17, 2012  (JP) .................................. 2012-007381

(51) Int. Cl.
  *G06K 15/00*   (2006.01)
  *G06K 15/02*   (2006.01)
  *G06F 3/12*    (2006.01)
  *H04N 1/00*    (2006.01)

(52) U.S. Cl.
  CPC ......... *G06K 15/1848* (2013.01); *G06F 3/1208* (2013.01); *G06F 3/1242* (2013.01); *G06F 3/1285* (2013.01); *G06K 15/1819* (2013.01); *H04N 1/00129* (2013.01)

(58) Field of Classification Search
  CPC ....................................................... H04N 1/387
  See application file for complete search history.

(56) References Cited

U.S. PATENT DOCUMENTS

| | | | |
|---|---|---|---|
| 2005/0223309 A1 | 10/2005 | Lee et al. | |
| 2007/0044028 A1* | 2/2007 | Dunn ....................... | H04N 7/15 715/761 |
| 2007/0189736 A1* | 8/2007 | Satoh et al. .................. | 386/117 |
| 2008/0037081 A1* | 2/2008 | Shibamiya et al. .......... | 358/540 |
| 2009/0051952 A1 | 2/2009 | Abe et al. | |
| 2009/0284795 A1 | 11/2009 | Torikoshi | |
| 2011/0279842 A1 | 11/2011 | Abe et al. | |
| 2012/0096360 A1* | 4/2012 | Nishikawa .................... | 715/731 |

FOREIGN PATENT DOCUMENTS

| | | |
|---|---|---|
| JP | 2002-247539 | 8/2002 |
| JP | 2007-72687 | 3/2007 |

* cited by examiner

*Primary Examiner* — Ryan D McCulley
(74) *Attorney, Agent, or Firm* — Oblon, McClelland, Maier & Neustadt, L.L.P.

(57) ABSTRACT

In an embodiment, a display control device includes: a control unit configured to control the display and output of image data; a display information generating unit configured to generate display information including at least an image ID for identifying the image data and a display period whenever the image data is output by the control unit for display; and a transmitting unit configured to transmit the display information to an external device so that the display information is managed by the external device as one unit information item serving as a unit of image formation together with other display information items having a predetermined relation with the display information.

20 Claims, 33 Drawing Sheets

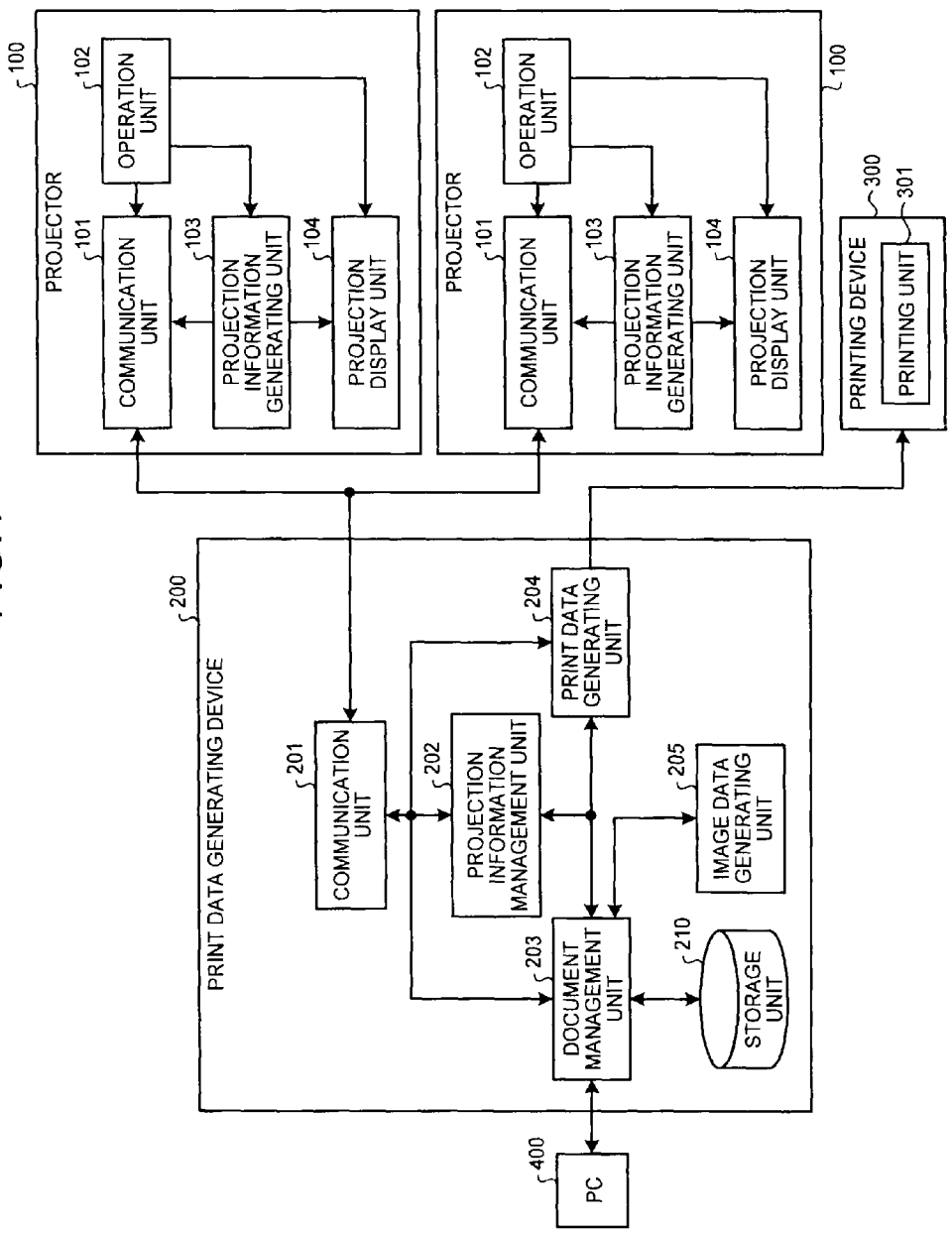

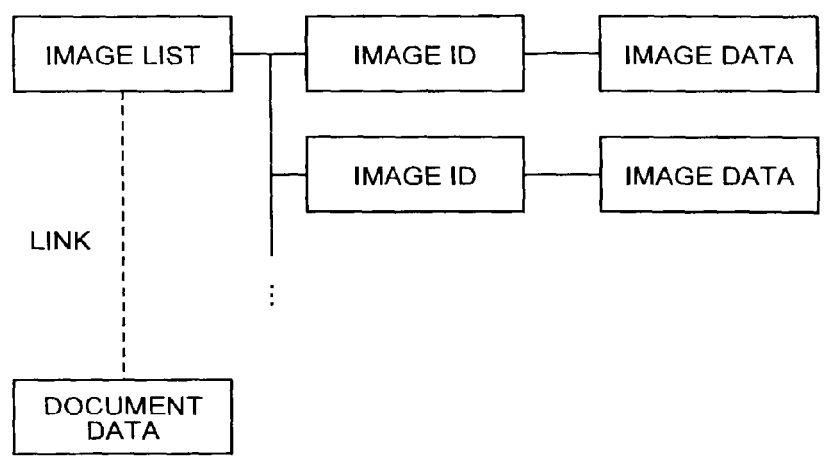

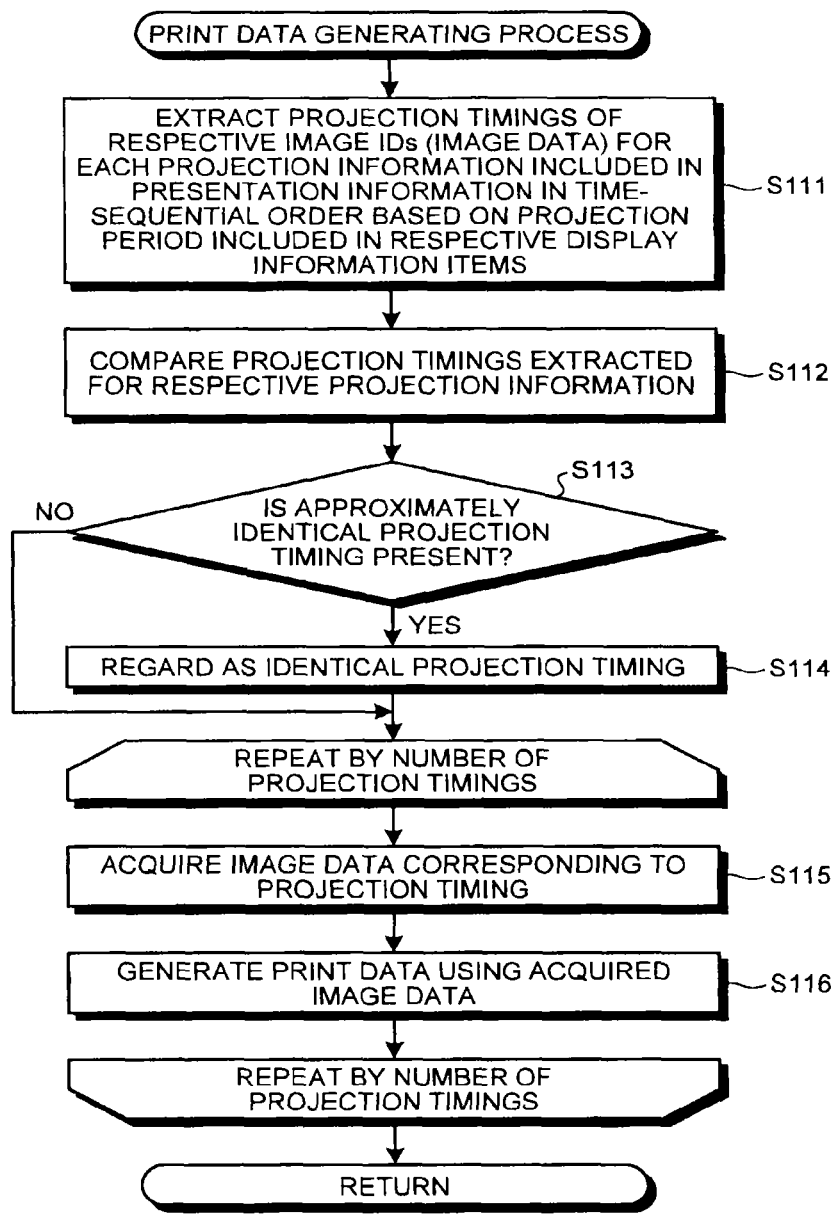

FIG.13

| | | IMAGE ID | PAGE NUMBER | PROJECTION PERIOD (SECOND) | OPERA-TION CONTENT | IMAGE SIZE (pixel) | PROJEC-TION SIZE (%) | PROJECTION PLACE INFORMATION |
|---|---|---|---|---|---|---|---|---|
| PRESENTATION INFORMATION | PROJECTION INFORMATION (DEVICE 1) | | | | | | | |
| | DISPLAY INFORMATION | 1 | 1 | 31 | PROCEED | 1024×768 | 100 | CONFERENCE ROOM A |
| | DISPLAY INFORMATION | 2 | 2 | 59 | PROCEED | 1024×768 | 100 | |
| | DISPLAY INFORMATION | 3 | 3 | 30 | PROCEED | 1024×768 | 100 | |
| | PROJECTION INFORMATION (DEVICE 2) | | | | | | | |
| | DISPLAY INFORMATION | 4 | 1 | 29 | PROCEED | 1024×768 | 100 | CONFERENCE ROOM B |
| | DISPLAY INFORMATION | 5 | 2 | 31 | PROCEED | 1024×768 | 100 | |
| | DISPLAY INFORMATION | 6 | 3 | 60 | PROCEED | 1024×768 | 100 | |

FIG.17
FIRST PAGE
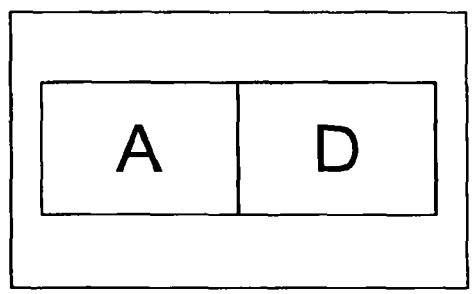
SECOND PAGE
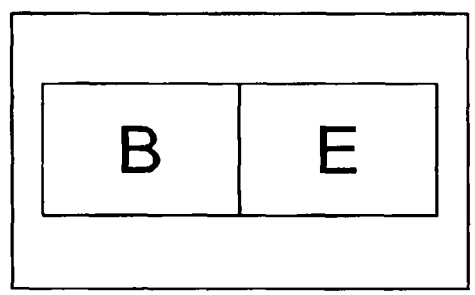
THIRD PAGE
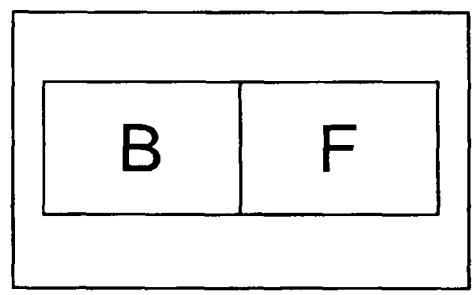
FOURTH PAGE
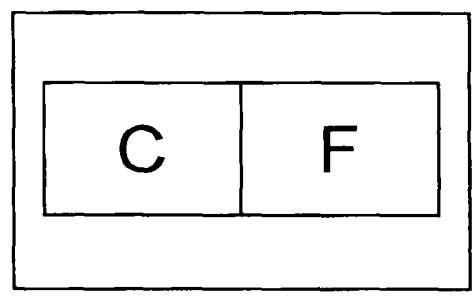

FIG.19
FIRST PAGE
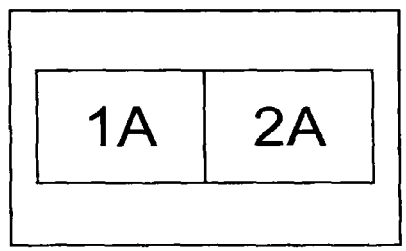
SECOND PAGE
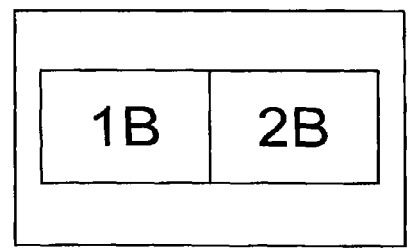
THIRD PAGE
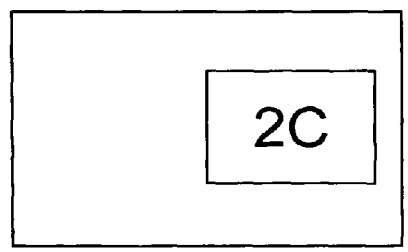
FOURTH PAGE
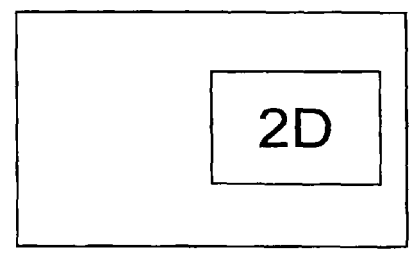
FIFTH PAGE
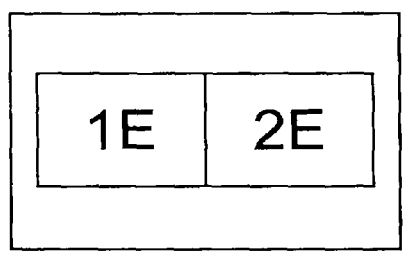
SIXTH PAGE
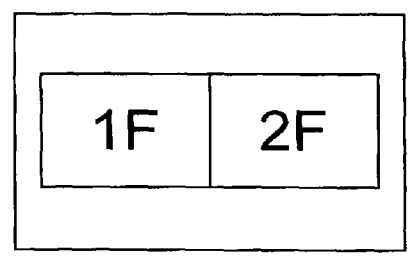

FIG.20

| | | IMAGE ID | PAGE NUMBER | PROJECTION PERIOD (SECOND) | OPERA-TION CONTENT | IMAGE SIZE (pixel) | PROJEC-TION SIZE (%) | PROJECTION PLACE INFORMATION |
|---|---|---|---|---|---|---|---|---|
| PRESENTATION INFORMATION | PROJECTION INFORMATION (DEVICE 1) | DISPLAY INFORMATION | 1 | 1 | 30 | PROCEED | 1024×768 | 100 | CONFERENCE ROOM A |
| | | DISPLAY INFORMATION | 2 | 2 | 60 | PROCEED | 1024×768 | 100 | |
| | | DISPLAY INFORMATION | 3 | 3 | 27 | PROCEED | 1024×768 | 100 | |
| | | DISPLAY INFORMATION | 4 | 4 | 3 | PROCEED | 1024×768 | 100 | |
| | | DISPLAY INFORMATION | 5 | 5 | 60 | PROCEED | 1024×768 | 100 | |
| | | DISPLAY INFORMATION | 6 | 6 | 30 | PROCEED | 1024×768 | 100 | |
| | PROJECTION INFORMATION (DEVICE 2) | DISPLAY INFORMATION | 7 | 1 | 30 | PROCEED | 1024×768 | 100 | CONFERENCE ROOM A |
| | | DISPLAY INFORMATION | 8 | 2 | 30 | PROCEED | 1024×768 | 100 | |
| | | DISPLAY INFORMATION | 9 | 3 | 60 | PROCEED | 1024×768 | 100 | |
| | | DISPLAY INFORMATION | 10 | 4 | 60 | PROCEED | 1024×768 | 100 | |
| | | DISPLAY INFORMATION | 11 | 5 | 30 | PROCEED | 1024×768 | 100 | |

FIG.21

| | IMAGE ID | IMAGE DATA |
|---|---|---|
| | 1 | A.jpg |
| | 2 | B.jpg |
| | 3 | C.jpg |
| | 4 | D.jpg |
| | 5 | E.jpg |
| IMAGE LIST | 6 | F.jpg |
| | 7 | G.jpg |
| | 8 | H.jpg |
| | 9 | I.jpg |
| | 10 | J.jpg |
| | 11 | K.jpg |

FIG.23
FIRST PAGE
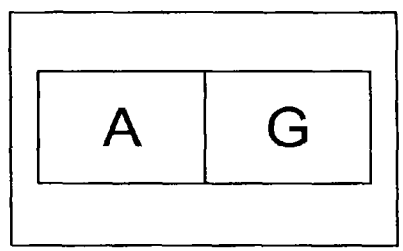
SECOND PAGE
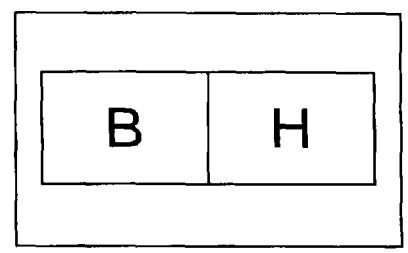
THIRD PAGE
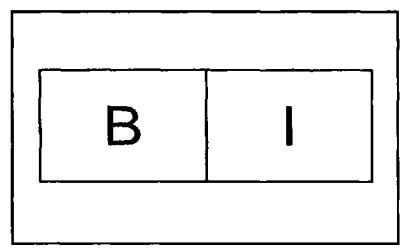
FOURTH PAGE
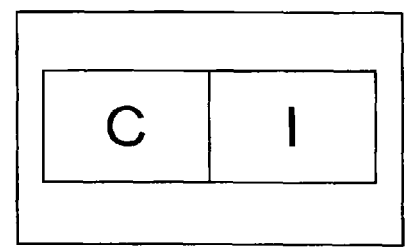
FIFTH PAGE
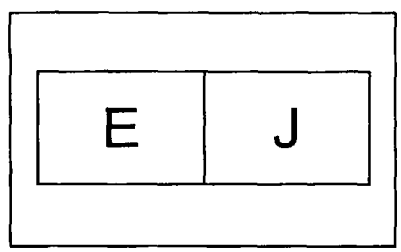
SIXTH PAGE
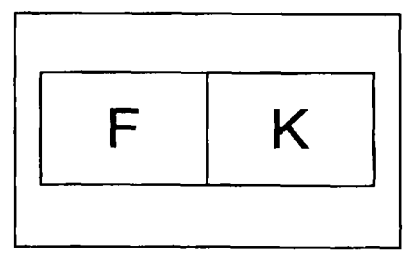

FIG.25

| | | IMAGE ID | PAGE NUMBER | PROJECTION PERIOD (SECOND) | OPERATION CONTENT | IMAGE SIZE (pixel) | PROJECTION SIZE (%) | PROJECTION PLACE INFORMATION |
|---|---|---|---|---|---|---|---|---|
| PRESENTATION INFORMATION | PROJECTION INFORMATION (DEVICE 1) | DISPLAY INFORMATION | 1 | 1 | 30 | PROCEED | 1024×768 | 100 | |
| | | DISPLAY INFORMATION | 2 | 2 | 30 | PROCEED | 1024×768 | 100 | CONFERENCE ROOM A |
| | | DISPLAY INFORMATION | 3 | 3 | 29 | PROCEED | 1024×768 | 100 | |
| | | DISPLAY INFORMATION | 2 | 4 | 2 | RETURN | 1024×768 | 100 | |
| | | DISPLAY INFORMATION | 3 | 5 | 29 | PROCEED | 1024×768 | 100 | |
| | | DISPLAY INFORMATION | 4 | 6 | 30 | PROCEED | 1024×768 | 100 | |
| | PROJECTION INFORMATION (DEVICE 2) | DISPLAY INFORMATION | 5 | 1 | 60 | PROCEED | 1024×768 | 100 | |
| | | DISPLAY INFORMATION | 6 | 2 | 60 | PROCEED | 1024×768 | 100 | CONFERENCE ROOM B |
| | | DISPLAY INFORMATION | 7 | 3 | 30 | PROCEED | 1024×768 | 100 | |

FIG.26

| | IMAGE ID | IMAGE DATA |
|---|---|---|
| | 1 | A.jpg |
| | 2 | B.jpg |
| | 3 | C.jpg |
| IMAGE LIST | 4 | D.jpg |
| | 5 | E.jpg |
| | 6 | F.jpg |
| | 7 | G.jpg |

FIG.28
FIRST PAGE
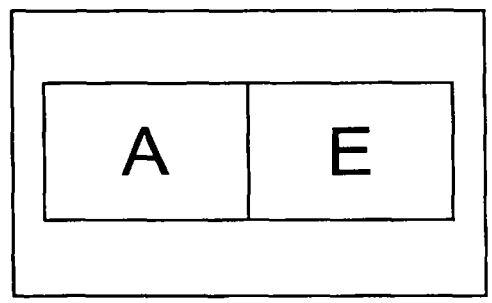
SECOND PAGE
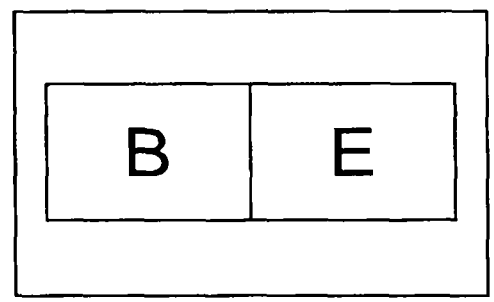
THIRD PAGE
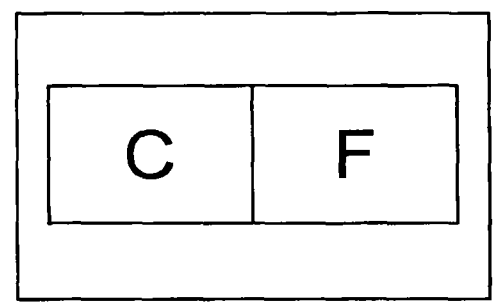
FOURTH PAGE
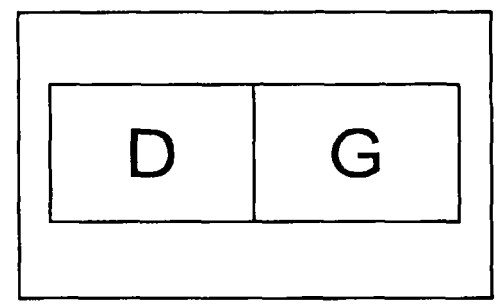

FIG.30
FIRST PAGE
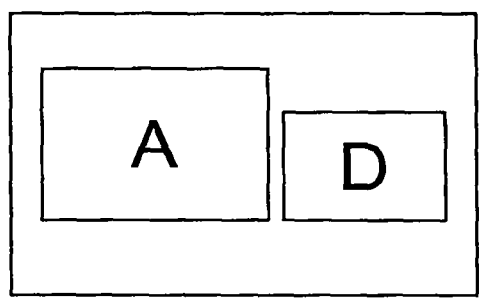
SECOND PAGE
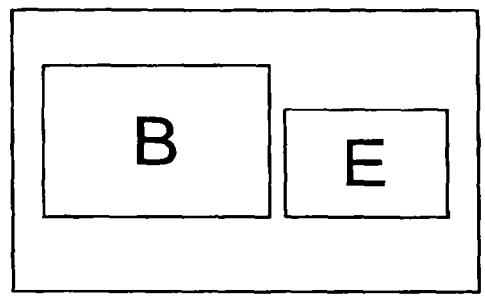
THIRD PAGE
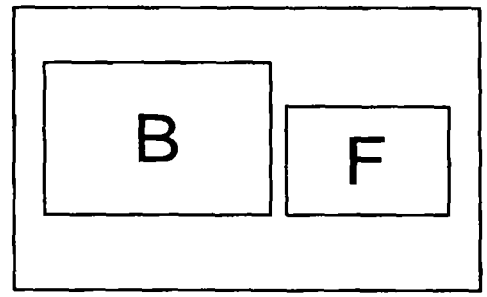
FOURTH PAGE
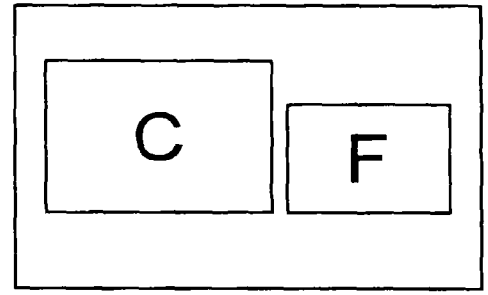

FIG.31
FIRST PAGE
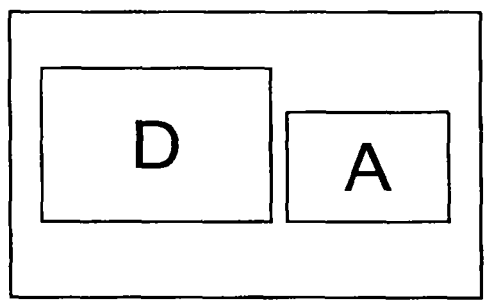
SECOND PAGE
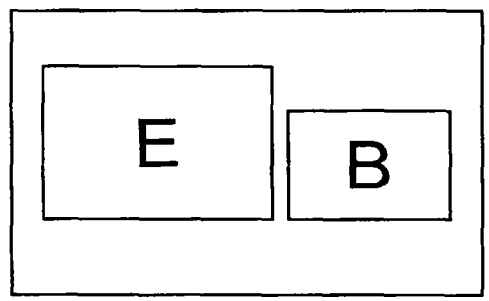
THIRD PAGE
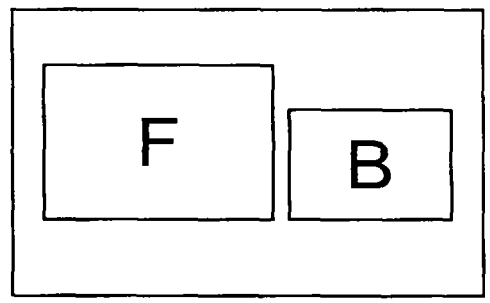
FOURTH PAGE
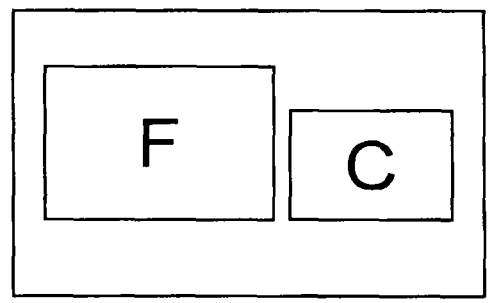

IMAGE FORMATION DATA GENERATING DEVICE AND METHOD FOR GENERATING IMAGE FORMATION DATA OF SIMULTANEOUSLY DISPLAYED IMAGES

CROSS-REFERENCE TO RELATED APPLICATIONS

The present application is a continuation of U.S. application Ser. No. 13/422,602, filed Mar. 16, 2012, and claims priority to and incorporates by reference the entire contents of Japanese Patent Application No. 2011-061518 filed in Japan on Mar. 18, 2011 and Japanese Patent Application No. 2012-007381 filed in Japan on Jan. 17, 2012.

BACKGROUND OF THE INVENTION

1. Field of the Invention

The present invention relates to a display control device, an image formation data generating device, and an information display system.

2. Description of the Related Art

There is a case where a presenter projects a presentation material generated on a PC (personal computer) on a screen using a projector as an information projecting device while distributing a number of prints of the presentation material to participants attended in a lecture, a presentation, or a meeting conducted in an office or a college. In such a case, a technique in which the PC and the projector are connected through wires or wirelessly and a known technique in which the material is printed from the PC are used regarding projection.

For example, Japanese Patent Application Laid-open No. 2007-072687 discloses a technique in which a server device has a function of transmitting image data received from a main terminal used by a presenter to sub-terminals used by participants, so that a participant may capture and use desired image data by operating a sub-terminal.

Moreover, Japanese Patent Application Laid-open No. 2002-247539 discloses a technique in which data of a presentation material, stored in advance in a storage location designated by a URL (uniform resource locator), is acquired on a projector side from the storage location and projected for display, so that a PC on an operator side does not need to hold data of the presentation material to be projected for display.

However, there is a case where plural image data having a predetermined relation are projected and displayed using one projector plural times or plural projectors. However, in the related art, when projecting the screen of a PC as it is using a projector, that is, when storing image data in a USB (universal serial bus) memory or the like and transmitting image data to be displayed to a projector through a network, it is difficult to perform image formation such as printing of these image data at a time while reflecting the state at the time of performing projection display. There is a need of a display control device, an image formation data generating device, and an information display system capable of printing image data projected and displayed using one projector plural times or plural projectors at a time while reflecting the state at the time of performing projection display.

SUMMARY OF THE INVENTION

It is an object of the present invention to at least partially solve the problems in the conventional technology.

In an embodiment, a display control device includes: a control unit configured to control the display and output of image data; a display information generating unit configured to generate display information including at least an image ID for identifying the image data and a display period whenever the image data is output by the control unit for display; and a transmitting unit configured to transmit the display information to an external device so that the display information is managed by the external device as one unit information item serving as a unit of image formation together with other display information items having a predetermined relation with the display information.

In another embodiment, an image formation data generating device includes: a storage unit configured to store plural image data so as to be associated with an image ID; a providing unit configured to provide image data stored in the storage unit to the external device in response to a request from the external device; a first acquiring unit configured to acquire, from the external device, display information including at least an image ID for identifying each of the image data provided by the providing unit and a display period when the image data is output and displayed by the external device; a management unit configured to manage the display information acquired by the first acquiring unit so as to be associated with other display information items having a predetermined relation with the display information as one unit information item serving as a unit of image formation; a receiving unit configured to receive a print request instructing specific unit information; a second acquiring unit configured to acquire the display information related to the unit information instructed by the print request from the management unit and acquire image data corresponding to the image ID included in the display information from the storage unit; an extracting unit configured to extract a timing at which the display and output of the image data corresponding to the image ID is started based on a display period of the image ID included in the respective display information items acquired by the second acquiring unit; and an image formation data generating unit configured to generate image formation data in a time-sequential order using image data corresponding to the respective timings extracted by the extracting unit.

In still another embodiment, an information display system includes one or plural display control devices and an image formation data generating device connected to each of the display control devices. The display control device includes: a control unit configured to control the display and output of image data; a display information generating unit configured to generate display information including at least an image ID for identifying the image data output for display and a display period whenever the image data is output by the control unit for display; and a transmitting unit configured to transmit the display information generated by the display information generating unit to the image formation data generating device. The image formation data generating device includes: a management unit configured to manage the display information transmitted by the transmitting unit so as to be associated with other display information items having a predetermined relation with the display information as one unit information item serving as a unit of image formation; a receiving unit configured to receive a print request instructing specific presentation information; a second acquiring unit configured to acquire the display information related to the presentation information instructed by the print request from the management unit and acquire image data corresponding to the image ID included in the display information; an extracting unit configured to extract a timing at which the display and output of the image data corresponding to the image ID is started based on a display period of the image ID included in the respective display information items acquired by the second acquiring unit; and an image formation data generating unit configured to generate image formation data in a time-sequential order using image data corresponding to the respective timings extracted by the extracting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a network configuration of an information display system according to a first embodiment and the functional configurations of a projector, a print data generating device, and a printing device;

FIG. 2 is an explanatory diagram illustrating an example of a data structure of an image list;

FIG. 3 is an explanatory diagram illustrating an example of a link table according to the first embodiment;

FIG. 12 is a flowchart illustrating the flow of a print data generating process according to the first embodiment;

FIG. 13 is a diagram illustrating an example of presentation information stored in a projection information management unit;

FIG. 17 is a diagram illustrating an example of print data;

FIG. 19 is a diagram illustrating an example of print data;

FIG. 20 is a diagram illustrating an example of presentation information stored in a projection information management unit;

FIG. 21 is a diagram illustrating an example of an image list stored in a storage unit;

FIG. 23 is a diagram illustrating an example of print data;

FIG. 25 is a diagram illustrating an example of presentation information stored in a projection information management unit;

FIG. 26 is a diagram illustrating an example of an image list stored in a storage unit;

FIG. 28 is a diagram illustrating an example of print data;

FIG. 30 is a diagram illustrating an example of print data;

FIG. 31 is a diagram illustrating an example of print data;

DETAILED DESCRIPTION OF THE PREFERRED EMBODIMENTS

Figure 4:
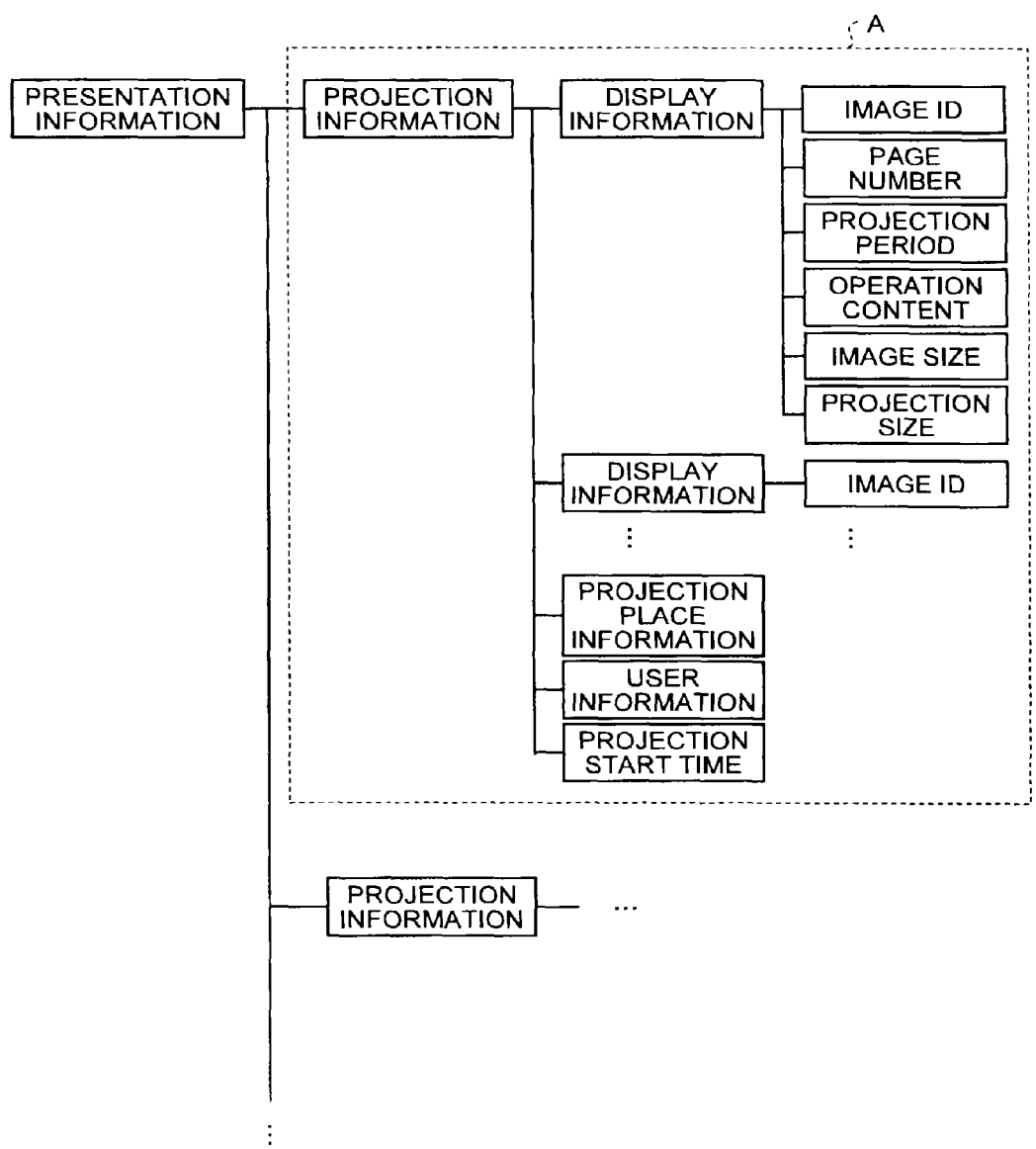
FIG. 4 is an explanatory diagram illustrating an example of a data structure of projection information included in presentation information according to the first embodiment.

Hereinafter, an embodiment of a display control device, an image formation data generating device, and an information display system will be described in detail with reference to the accompanying drawings.

First Embodiment

FIG. 1 is a block diagram illustrating a network configuration of an information display system of a first embodiment and the functional configurations of a projector, a print data generating device, and a printing device. The information display system according to the present embodiment includes a projector 100 as a display control device, a print data generating device 200 as an image formation data generating device, a printing device 300 as an image forming device, and a PC 400, and each of which are connected to a network such as the Internet. In FIG. 1, although the information display system includes two projectors 100, the number of the projectors 100 connected to the network is not limited to this.

The projector 100 is an information display device which includes a projecting unit (not illustrated) and has a function as a display control device that projects and displays (displays and outputs) various kinds of data such as a character or an image on a projection screen or the like. The print data generating device 200 is configured to generate print data (image formation data) for printing (forming the image) of document data being projected and displayed and transmitting the print data to the printing device 300. Here, PDL (print description language) data is an example of the print data. The printing device 300 includes a printing unit 301 and is configured to receive print data generated by the print data generating device 200 and print the print data on a recording medium using the printing unit 301.

Details of the projector 100 will be described. As illustrated in FIG. 1, the projector 100 mainly includes a communication unit 101, an operation unit 102, a projection information generating unit 103, and a projection display unit 104.

When performing projection display of document data, the communication unit 101 asks the print data generating device 200 for an image list of document data of a projection display subject to receive the image list. Moreover, the communication unit 101 transmits projection information described later, generated by the projection information generating unit 103 to the print data generating device 200. Furthermore, the communication unit 101 transmits a print request for printing presentation information described later, received from the operation unit 102 to the print data generating device 200.

The operation unit 102 is an input device configured, for example, of buttons, a remote controller receiver, and the like. Moreover, the operation unit 102 may be configured to include a keyboard. The operation unit 102 is configured to be capable of inputting a projection place of the projector 100, the user information of a user, or the like in accordance with the operation of the user.

The projection information generating unit 103 detects a projection display state of the projection display unit 104 for each image data and transmits one or plural display information items representing the detection result (that is, the projection display state) to the print data generating device 200 through the communication unit 101 as projection information.

Here, examples of the display information representing the projection display state include "image ID" representing the image data which is the subjected to the projection display by the projection display unit 104 of the projector 100, "page number" representing the order of the projection display of the image data, "projection period" when projection display of the image data is performed, "operation content" when the projection display of the image data was performed, "image size" of the image data, and "projection size" used for the projection display. When "projection place information" representing the projection place of the projector 100, "user information" of the user operating the projector 100, and the like are input through the operation unit 102 and the like, these information items are transmitted in a state of being included in projection information.

The projection display unit 104 projects and displays image data included in an image list corresponding to the document data on a screen in a display order instructed by the user.

Subsequently, details of the print data generating device 200 will be described. As illustrated in FIG. 1, the print data generating device 200 mainly includes a communication unit 201, a projection information management unit 202, a document management unit 203, a print data generating unit 204, an image data generating unit 205, and a storage unit 210.

The storage unit 210 is a storage medium such as a hard disk drive (HDD) and stores document data described later, an image list, and the like. Here, examples of the document data include data generated by presentation material creation software, a word processor, or the like or display data converted from these data. However, the document data is not limited to these examples.

The image data generating unit 205 converts one page or each of the plural pages of the document data into image data of such a format that the image data can be projected and displayed by the projector 100. Examples of such a format that the image data can be projected and displayed by the projector 100 include the JPEG format, but the format is not limited to this.

The document management unit 203 receives document data projected by the projector 100 from the PC 400 and stores the received document data in the storage unit 210. Moreover, the document management unit 203 stores an image list including the list of the image data converted by the image data generating unit 205 in the storage unit 210 and links the image list with document data including the image data constituting the image list. In this way, the document data is associated with the image list.

FIG. 2 is an explanatory diagram illustrating an example of the data structure of the image list. As illustrated in FIG. 2, in the image list, the image data converted for the purpose of projection display and an image ID for uniquely identifying the image data are included in an associated manner. The document management unit 203 links such an image list and document data of a conversion source together by generating a link table.

FIG. 3 is an explanatory diagram illustrating an example of the link table. The link table is stored in the storage unit 210. As illustrated in FIG. 3, the document management unit 203 registers a document data name which is a file name of the document data and an image list name which is a file name of an image list including image data converted from the document data in the link table in an associated manner.

Moreover, when receiving a request for the image list of document data of a projection display subject from the projector 100 through the communication unit 201, the document management unit 203 reads an image list corresponding to the document data of the projection display subject from the storage unit 210 by referring to the link table and transfers the image list to the communication unit 201.

Moreover, when receiving an acquisition request for image data from the print data generating unit 204, the document management unit 203 reads an image list corresponding to document data of a projection display subject from the storage unit 210 by referring to the link table and transfers the image list to the print data generating unit 204.

A method of linking the document data and the image list is not limited to the method using the link table, but an optional method may be employed as long as it links document data and the image list together.

Returning to FIG. 1, the communication unit 201 receives, from the projector 100, projection information generated by the projection information generating unit 103 of the projector 100. Moreover, upon receiving the request from the projector 100, the communication unit 201 transmits document data, the list of the document data, presentation information, and the like to the projector 100. Furthermore, upon receiving a print request instructing to print document data being projected and displayed from the projector 100, the communication unit 201 transmits the print request to the print data generating unit 204.

The projection information management unit 202 stores the projection information received from the projector 100. The projection information is generated on the projector 100 side whenever each projector 100 performs projection display. The generated projection information is sequentially transmitted from the projector 100 to the projection information management unit 202 through the communication unit 201 (whenever the projection information is generated). The projection information management unit 202 sequentially stores the received projection information so as to be associated with any one of the presentation information items.

Here, FIG. 4 is a diagram schematically illustrating an example of the presentation information. The presentation information functions as one unit information serving as the unit of image formation and has a data structure illustrated within dotted lines A. Here, the projection information includes one or plural display information items for one image data item, projection place information representing the projection place of the projector 100 that performs projection display of the image data, user information of the user operating the projector 100, and a projection start time representing the time when projection display is started. One display information item includes "image ID," "page number," "projection period," "operation content," "image size," "projection size," and the like as the information representing the projection display state.

Returning to FIG. 1, upon receiving a print request from the communication unit 201, the print data generating unit 204 acquires presentation information which is subject to printing from the projection information management unit 202. Moreover, the print data generating unit 204 acquires image data corresponding to each of the image IDs included in the presentation information which is subject to printing from the document management unit 203. Moreover, the print data generating unit 204 extracts the timing of projecting respective image data based on a projection period of each of projection information items included in the presentation information and arranges the acquired image data in a print memory region corresponding to a sheet size for printing the acquired image data to thereby generate print data in the order and the configuration according to the timing of the projecting. The print data generating unit 204 transmits all of the generated print data to the printing device 300 so that the print data is printed by the printing device 300. A specific method of generating print data based on projection information will be described later.

Figure 5:
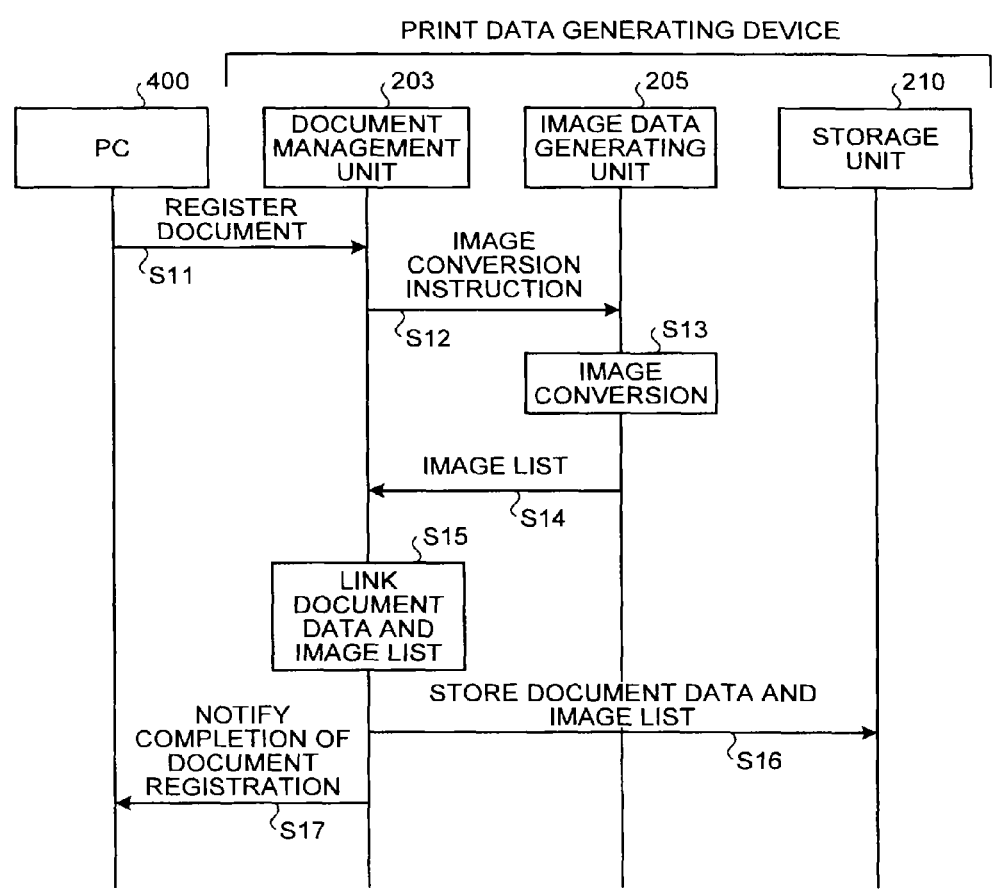
FIG. 5 is a sequence diagram of a document data registration process according to the first embodiment.

Subsequently, a document data registration process by the information display system according to the present embodiment having the above configuration will be described. FIG. 5 is a sequence diagram of a document data registration process according to the first embodiment.

First, the PC 400 transmits an instruction to register documents to the document management unit 203 of the print data generating device 200 together with document data (step S11). The document management unit 203 of the print data generating device 200 transmits an instruction to convert the received document data into an image to the image data generating unit 205 (step S12).

The image data generating unit 205 converts one page or each of the plural pages of the document data into image data of such a format that the image data can be projected and displayed by the projector 100 (step S13). The image data generating unit 205 generates an image list illustrated in FIG. 2 from the image data and transmits the generated image list to the document management unit 203 (step S14).

Subsequently, the document management unit 203 links the document data received from the PC 400 with the image list received from the image data generating unit 205 (step S15). The document management unit 203 registers the document data and the image list by storing them in the storage unit 210 (step S16). When the document data and the image list are completely stored in the storage unit 210, the document management unit 203 transmits a notification of completion of document registration to the PC 400 that transmitted the document data (step S17). In this way, document data is registered.

Figure 6:
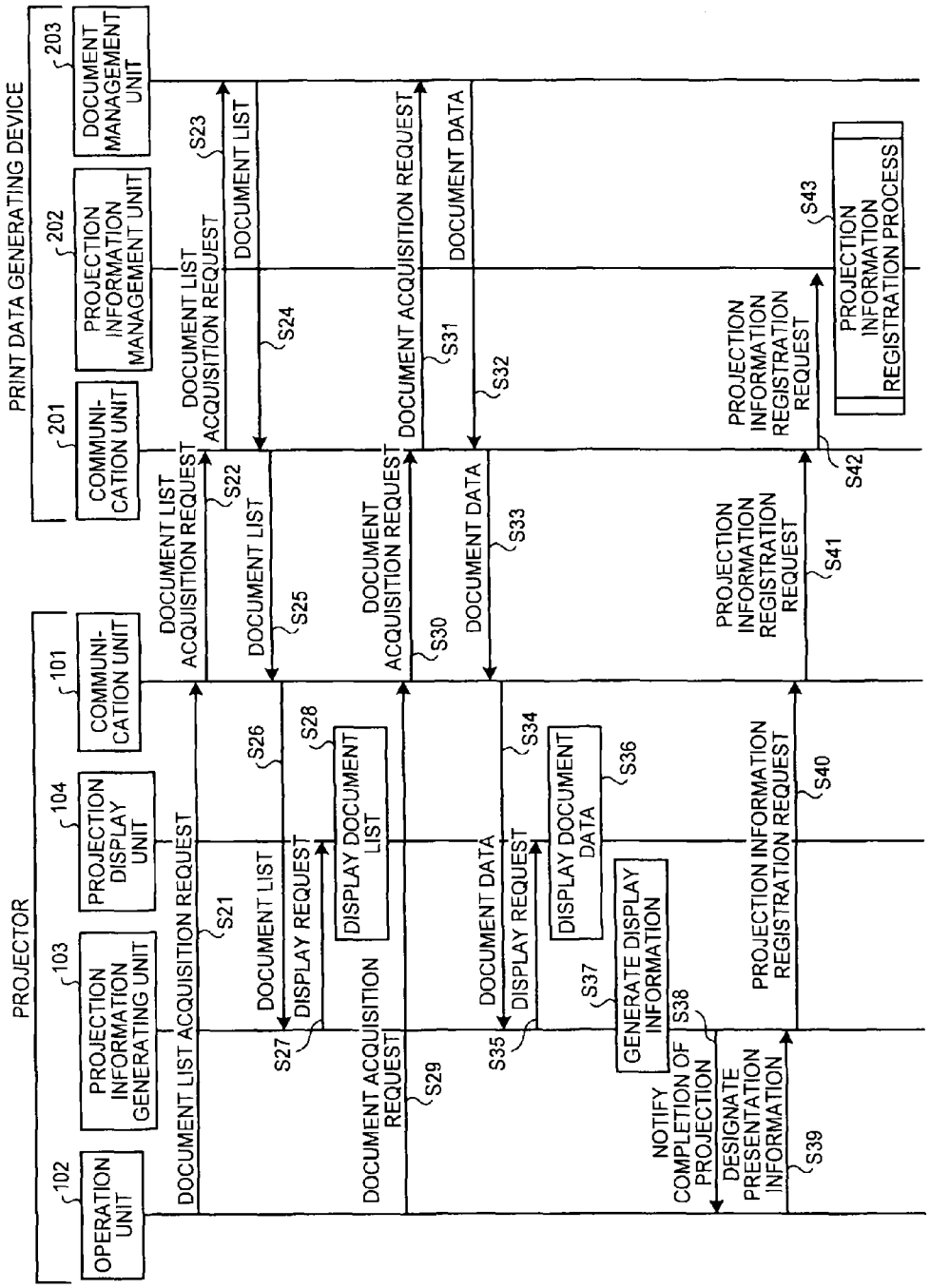
FIG. 6 is a sequence diagram illustrating the flow of a projection display process according to the first embodiment.

Subsequently, a process of projecting and displaying document data by the information display system according to the present embodiment will be described. FIG. 6 is a sequence diagram illustrating the flow of a projection display process according to the first embodiment.

First, in the projector 100, when the user inputs an instruction requesting the display of a list of document data from the operation unit 102, the operation unit 102 having received the instruction transmits a request to acquire a list of documents to the print data generating device 200 through the communication unit 101 (steps S21 and S22).

When the document list acquisition request is received through the communication unit 201, the print data generating device 200 transmits the document list acquisition request to the document management unit 203 (step S23).

The document management unit 203 having received the document list acquisition request acquires a list of documents which lists the document data stored in the storage unit 210 and transmits the acquired document list to the projector 100 through the communication unit 201 (steps S24 and S25).

Upon receiving the document list from the print data generating device 200, the communication unit 101 of the projector 100 transmits the received document list to the projection information generating unit 103 (step S26). Upon receiving the document list from the communication unit 101, the projection information generating unit 103 transmits a request to display the document list to the projection display unit 104 together with the document list (step S27). Upon receiving the request to display the document list, the projection display unit 104 projects and displays the image data of the document list on the projection screen (step S28).

The user operates the operation unit 102 and determines document data which is subject to projection display while viewing the document list projected and displayed on the projection screen. The operation unit 102 having received the determination operation of the user transmits a document acquisition request requesting the acquisition of the instructed document data to the print data generating device 200 through the communication unit 101 (steps S29 and S30).

When the document acquisition request is received through the communication unit 201, the print data generating device 200 transmits the document acquisition request to the document management unit 203 (step S31). The document management unit 203 having received the document acquisition request acquires the instructed document data (including the corresponding image list) from the document data stored in the storage unit 210 and transmits the acquired document data to the projector 100 through the communication unit 201 (steps S32 and S33).

Upon receiving the document data from the print data generating device 200, the communication unit 101 of the projector 100 transmits the received document data to the projection information generating unit 103 (step S34). Upon receiving the document data from the communication unit 101, the projection information generating unit 103 transmits a request to display the document data to the projection display unit 104 together with the document data (step S35). Upon receiving the request to display the document data, the projection display unit 104 projects and displays image data included in the document data on the projection screen (step S36).

Moreover, in accordance with an instruction such as "Proceed" or "Return" input through the operation unit 102, the projection information generating unit 103 changes the image data which is projected and displayed by the projection display unit 104 and sequentially generates display information representing the projection display state for each image data (step S37). Moreover, when a projection start time is included in the projection information, the projection information generating unit 103 acquires the time when projection display is started from a clock unit (for example, a real time clock or the like) which is not illustrated and holds the acquired time as a projection start time. When the projection display of image data is completed, the projection information generating unit 103 transmits a notification of completion of projection to the operation unit 102 (step S38).

When presentation information serving as the destination where the projection information generated by the projection information generating unit 103 is registered is designated by the user through the operation unit 102, the operation unit 102 transmits the designated presentation information to the projection information generating unit 103 (step S39). Here, a screen may be projected and displayed so that presentation information serving as a registration destination is selected. In this case, after a list showing the content (projection information) of respective presentation information items is acquired from the projection information management unit 202 of the print data generating device 200, the list may be projected and displayed in a manner similar to steps S27 and S28.

In response to the notification from the operation unit 102, the projection information generating unit 103 uses one or plural display information items generated in step S37 as projection information and transmits the projection information and a projection information registration request including the designated presentation information to the print data generating device 200 through the communication unit 101 (steps S40 and S41). When the user information, the projection place information, and the projection start time are acquired, these information items are transmitted in a state of being included in the projection information.

When the projection information registration request is received through the communication unit 201, the print data generating device 200 transmits the projection information registration request to the projection information management unit 202 (step S42). The projection information management unit 202 having received the projection information registration request executes a projection information registration process described later and registers (stores) the projection information included in the projection information registration request so as to be correlated with any one of the presentation information items (step S43).

As above, the projection information generated by the projection information generating unit 103 of each projector 100 is registered in the projection information management unit 202 of the print data generating device 200.

Figure 7:
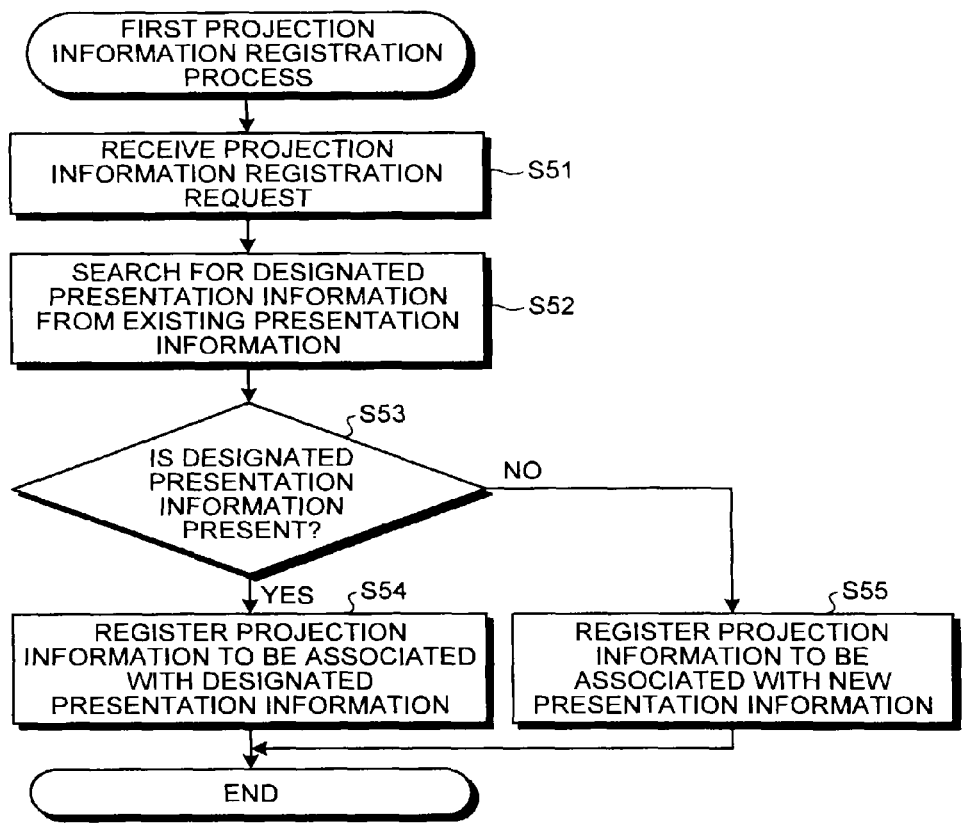
FIG. 7 is a flowchart illustrating the flow of a first projection information registration process.

Subsequently, details of the projection information registration process (first projection information registration process) in step S43 will be described. FIG. 7 is a flowchart illustrating the flow of the first projection information registration process.

Upon receiving the projection information registration request from the projector 100 (step S51), the projection information management unit 202 searches presentation information designated by the projection information registration request from existing presentation information (step S52) and determines whether the corresponding presentation information is present (step S53). Here, when the designated presentation information is present (Yes in step S53), the projection information management unit 202 registers (stores) projection information included in the projection information registration request so as to be correlated with the designated presentation information (step S54).

Moreover, when it is determined in step S53 that the designated presentation information is not present (No in step S53), the projection information management unit 202 generates new presentation information and registers (stores) projection information included in the projection information registration request so as to be correlated with the presentation information (step S55). In this way, the process ends.

As above, according to the first projection information registration process, it can register projection information in the presentation information designated by the user. In this way, plural projection information items having a predetermined relation can be registered so as to be correlated with the same presentation information. Thus, it is possible to generate print data using projection information having high correlation can be generated in a print data generating process described later.

In the present embodiment, although presentation information serving as the destination where the projection information is registered is selected by the instruction of the user, the embodiment is not limited to this. An embodiment in which the presentation information serving as the registration destination is automatically selected based on various kinds of information included in the projection information may be employed. Hereinafter, a projection information registration process of this embodiment will be described with reference to FIGS. 8 to 10.

Figure 8:
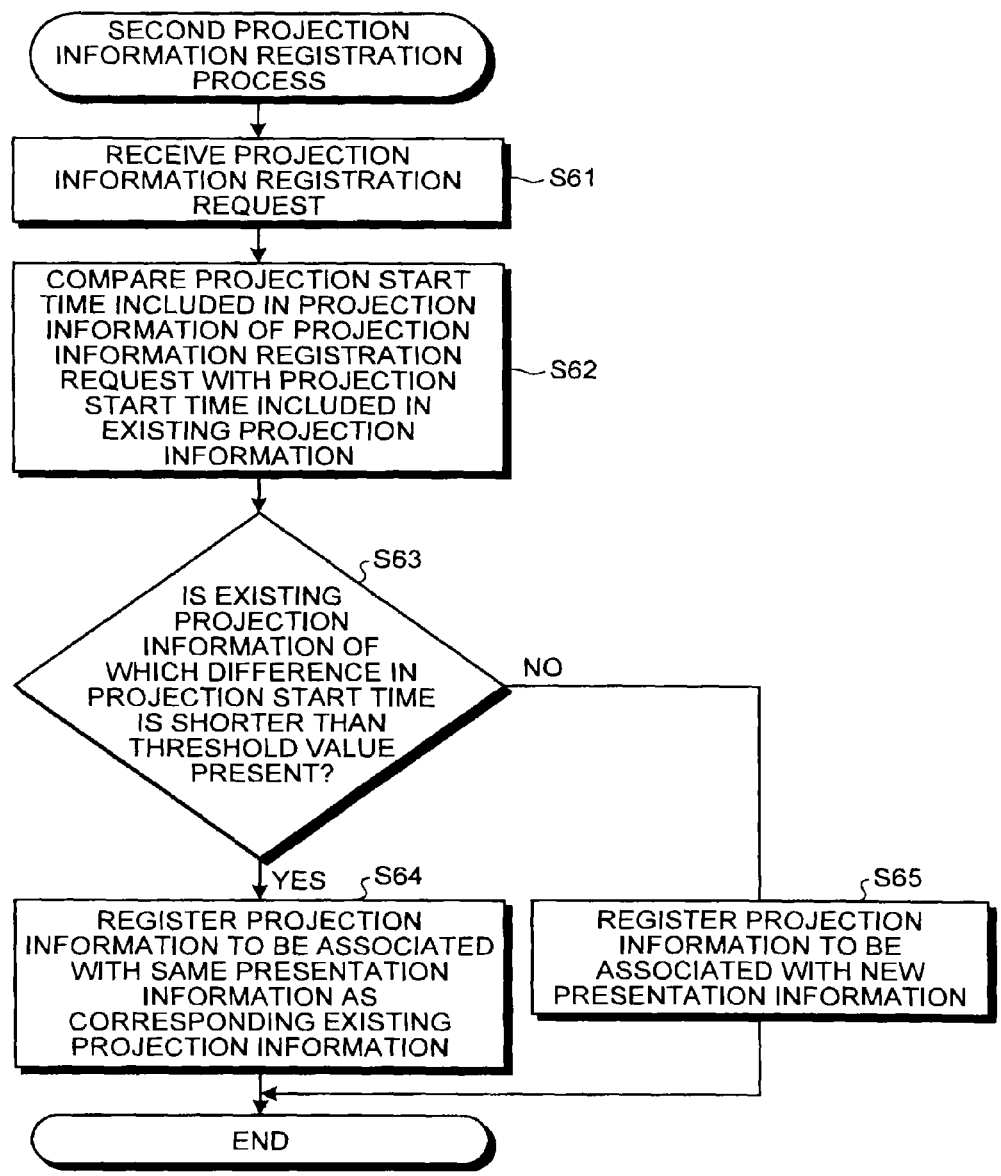
FIG. 8 is a flowchart illustrating the flow of a second projection information registration process.

First, an embodiment in which the presentation information serving as the registration destination is determined based on the projection start time included in the projection information will be described with reference to FIG. 8. Here, FIG. 8 is a flowchart illustrating the flow of a second projection information registration process. As a precondition to this process, it is assumed that the projection start time is acquired in the projector 100, and the projection information including the projection start time is transmitted to the projector 100.

Upon receiving the projection information registration request from the projector 100 (step S61), the projection information management unit 202 compares projection start time included in the projection information of the projection information registration request with projection start time included in existing projection information (hereinafter existing projection information) registered in respective presentation information items (step S62). Then, it is determined whether there is existing projection information in which the difference of both projection start time is within a predetermined threshold value (step S63). Here, when it is determined that the time difference of both projection start time is within a predetermined threshold value (for example, within 5 minutes) (Yes in step S63), the projection information management unit 202 registers (stores) the projection information included in the projection information registration request so as to be correlated with the same presentation information as the corresponding existing projection information (step S64). In this way, the process ends.

When it is determined in step S63 that there is not the existing projection information in which the time difference of both projection start time is within a predetermined threshold value (No in step S63), the projection information management unit 202 generates new presentation information and registers (stores) the projection information included in the projection information registration request so as to be correlated with the presentation information (step S65). In this way, the process ends.

As above, according to the second projection information registration process, the projection information transmitted from plural projectors 100 used in the same conference and presentation meeting or the like can be registered so as to be correlated with the same presentation information by determining the presentation information serving as the registration destination based on the projection start time. Thus, plural projection information items having a predetermined relation can be registered so as to be correlated with the same presentation information.

Figure 9:
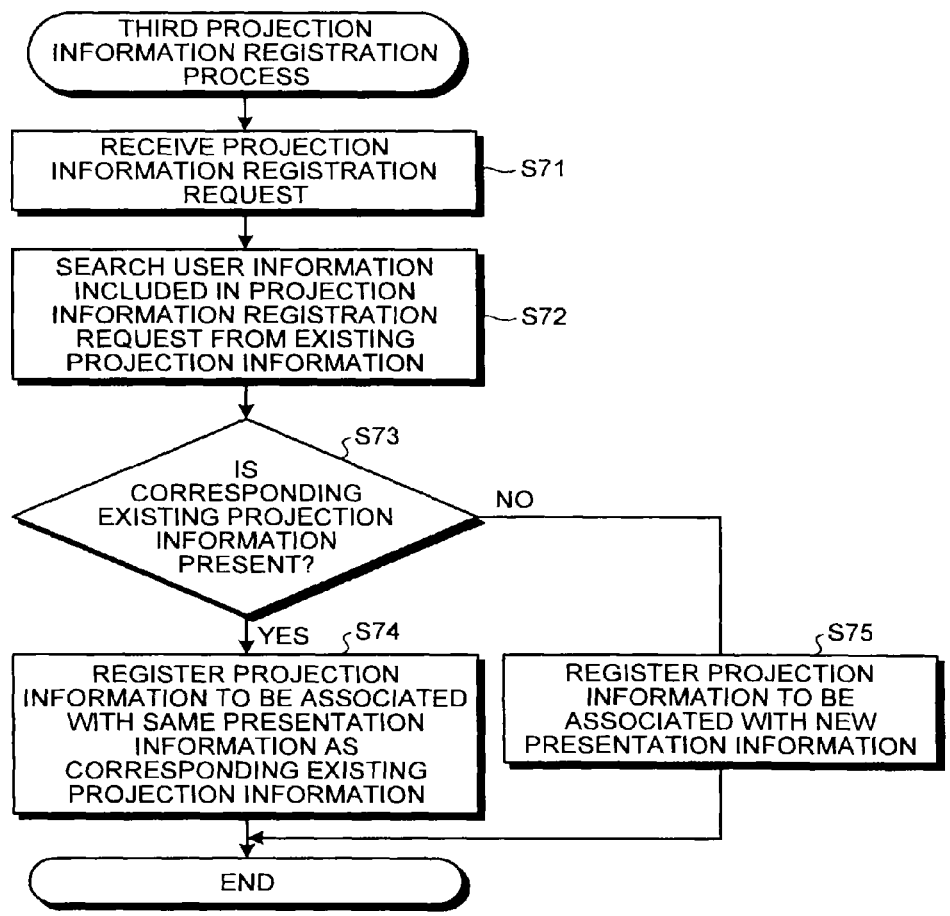
FIG. 9 is a flowchart illustrating the flow of a third projection information registration process.

Subsequently, an embodiment in which the presentation information serving as the registration destination is determined based on the user information included in the projection information will be described with reference to FIG. 9. Here, FIG. 9 is a flowchart illustrating the flow of a third projection information registration process. As a precondition to this process, it is assumed that user information is input to the projector 100, and projection information including the user information is transmitted to the projector 100.

Upon receiving a projection information registration request from the projector 100 (step S71), the projection information management unit 202 searches user information included in the projection information registration request from the projection information in existing presentation information (step S72) and determines whether the corresponding projection information is present (step S73). Here, when the corresponding projection information is present (Yes in step S73), the projection information management unit 202 registers (stores) projection information included in the projection information registration request so as to be correlated with the same presentation information as the corresponding existing projection information (step S74). In this way, the process ends.

When it is determined in step S73 that the corresponding projection information is not present (No in step S73), the projection information management unit 202 registers (stores) the projection information included in the projection information registration request so as to be correlated with the presentation information (step S75). In this way, the process ends.

As above, according to the third projection information registration process, the projection information when the projection display was performed by the same user can be registered so as to be correlated with the same presentation information by determining the presentation information serving as the registration destination based on the user information. Thus, plural projection information items having a predetermined relation can be registered so as to be correlated with the same presentation information.

Figure 10:
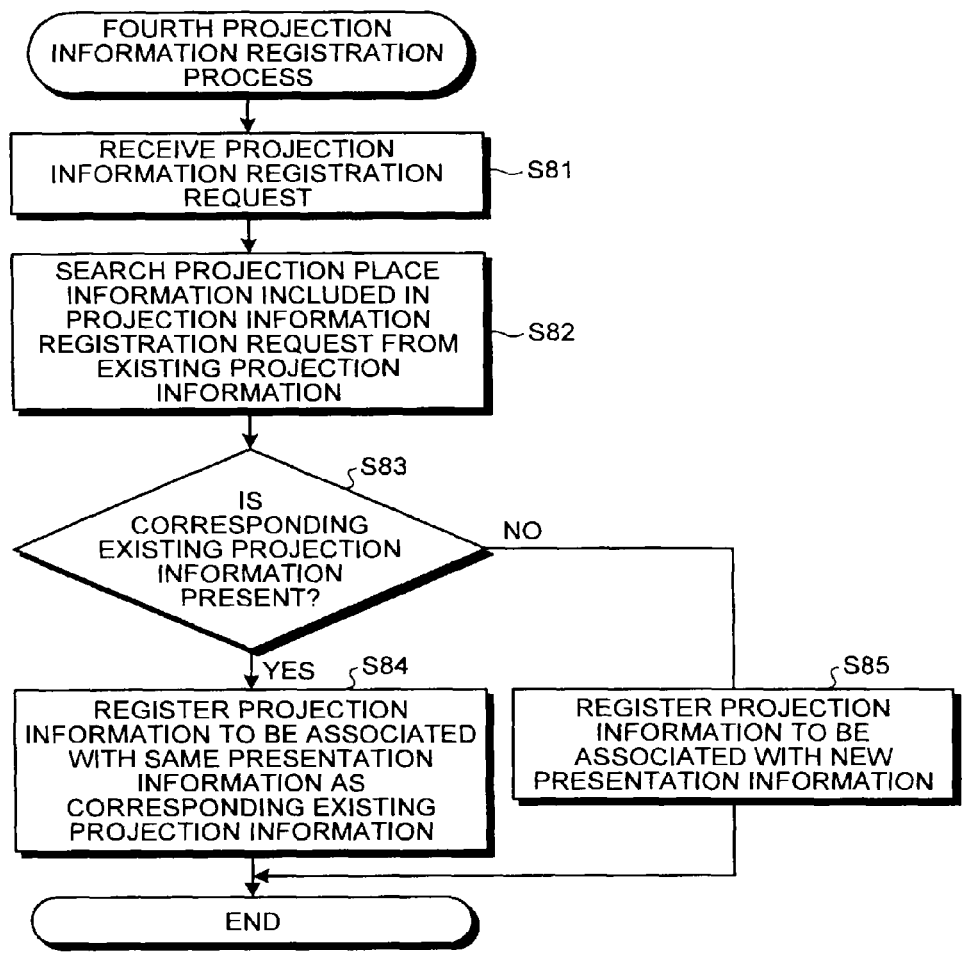
FIG. 10 is a flowchart illustrating the flow of a fourth projection information registration process.

Subsequently, an embodiment in which presentation information serving as a registration destination is determined based on the projection place information included in the projection information will be described with reference to FIG. 10. Here, FIG. 10 is a flowchart illustrating the flow of a fourth projection information registration process. As a precondition to this process, it is assumed that projection place information is input to the projector 100, and the projection information included in the projection place information is transmitted to the projector 100.

Upon receiving a projection information registration request from the projector 100 (step S81), the projection information management unit 202 searches projection place information included in the projection information registration request from the projection information in the existing presentation information (step S82) and determines whether the corresponding projection information is present (step S83). Here, when the corresponding projection information is present (Yes in step S83), the projection information management unit 202 registers (stores) the projection information included in the projection information registration request so as to be correlated with the same presentation information as the corresponding existing projection information (step S84). In this way, the process ends.

When it is determined in step S83 that the corresponding projection information is not present (No in step S83), the projection information management unit 202 registers (stores) the projection information included in the projection information registration request so as to be correlated with the presentation information (step S85). In this way, the process ends.

As above, according to the fourth projection information registration process, the projection information when projection display was performed in the same projection place can be registered so as to be correlated with the same presentation information by determining the presentation information serving as the registration destination based on the projection place where projection display was performed. Thus, plural projection information items having a predetermined relation can be registered so as to be correlated with the same presentation information.

Although among the first to fourth projection information registration processes described above, any one of the projection information registration processes is executed in step S43, the embodiment is not limited to this, and plural projection information registration processes may be executed in combination. Moreover, an embodiment in which document data to which an image ID included in respective display information items within projection information belongs is specified from the image ID, and the document data is registered (stored) so as to be correlated with the same presentation information as other projection information including the image ID belonging to the document data may be employed. In addition, an embodiment in which this condition is added as a refinement condition used for the first to fourth projection information registration processes may be employed.

Figure 11:
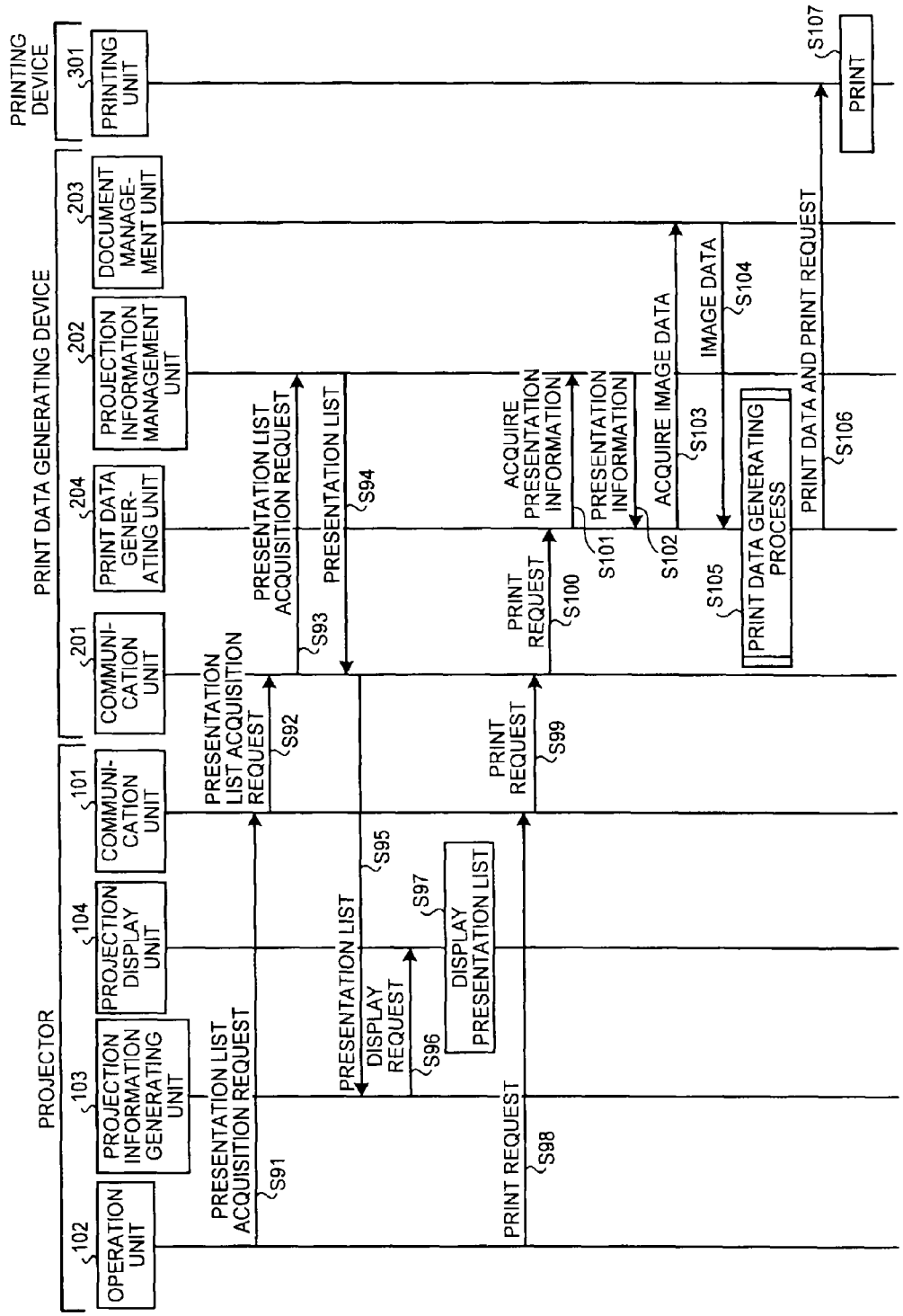
FIG. 11 is a sequence diagram illustrating the flow of a print process according to the first embodiment.

Subsequently, a print process by the information display system according to the present embodiment will be described. FIG. 11 is a sequence diagram illustrating the flow of a print process according to the first embodiment.

First, in the projector 100, when the user inputs an instruction requesting the acquisition of a list of presentation information items through the operation unit 102, the operation unit 102 having received this instruction transmits the presentation list acquisition request to the print data generating device 200 through the communication unit 101 (steps S91 and S92).

When the presentation list acquisition request is received through the communication unit 201, the print data generating device 200 transmits the presentation list acquisition request to the projection information management unit 202 (step S93). The projection information management unit 202 having received the presentation list acquisition request acquires a list of presentations which lists the presentation information and transmits the acquired presentation list to the projector 100 through the communication unit 201 (steps S94 and S95).

Upon receiving the presentation list from the print data generating device 200, the communication unit 101 of the projector 100 transmits the received presentation list to the projection information generating unit 103. Upon receiving the presentation list from the communication unit 101, the projection information generating unit 103 transmits a request to display the document list to the projection display unit 104 together with the presentation list (step S96). Upon receiving the request to display the presentation list, the projection display unit 104 projects and displays the image data of the presentation list on the projection screen (step S97).

The user operates the operation unit 102 and determines presentation information which is subject to printing while viewing the presentation list projected and displayed on the projection screen. The operation unit 102 having received the determination operation of the user transmits a print request requesting the printing of the instructed presentation information to the print data generating device 200 through the communication unit 101 (steps S98 and S99).

When the print request is received through the communication unit 201, the print data generating device 200 transmits the print request to the print data generating unit 204 (step S100). The print data generating unit 204 having received the print request instructs the projection information management unit 202 to acquire the presentation information instructed by the print request (step S101). The projection information management unit 202 acquires the presentation information instructed from the print data generating unit 204 and transmits the acquired presentation information to the print data generating unit 204 (step S102).

Upon receiving the presentation information, the print data generating unit 204 instructs the document management unit 203 to acquire image data corresponding to an image ID included in respective display information items of the projection information included in the presentation information (step S103). The document management unit 203 acquires image data corresponding to the respective image IDs instructed from the print data generating unit 204 and transmits the acquired image data to the print data generating unit 204 (step S104).

Upon receiving the image data, the print data generating unit 204 performs a print data generating process based on the image data and previously received presentation information (step S105). Here, details of the print data generating process will be described later.

Subsequently, the print data generating unit 204 transmits the generated print data to the printing device 300 together with the print request (step S106). The printing device 300 having received the print request prints the print data received by the printing unit 301 (step S107).

Next, details of the print data generating process in step S105 will be described. FIG. 12 is a flowchart illustrating the flow of the print data generating process according to the first embodiment.

First, the print data generating unit 204 extracts the timing of projecting respective image IDs (image data) in a time-sequential manner for each of the projection information items included in the presentation information which is subject to printing based on a projection period included in respective display information (step S111). Subsequently, the print data generating unit 204 compares the projection timings extracted for respective projection information (step S112) and determines whether approximately identical projection timings are present (step S113). Here, approximately identical projection timings represent that projection is started with a time difference of less than a predetermined threshold value, for example, within 2 seconds.

When it is determined in step S113 that approximately identical projection timings are present (Yes in step S113), the print data generating unit 204 regards the corresponding projection timing as identical projection timing (step S114). Then, the flow proceeds to step S115. When it is determined in step S113 that approximately identical projection timings are not present (No in step S113), the flow proceeds immediately to step S115.

Subsequently, the print data generating unit 204 repeatedly executes the processes of steps S115 and S116 below a number of times corresponding to the number of extracted projection timings in a time-sequential order.

The print data generating unit 204 acquires image data corresponding to a projection timing which is subject to processing (step S115). Here, the image data corresponding to the projection timing is image data which was displayed at the projection timing and is image data which is specified from an image ID, a page number, and a projection period included in the display information corresponding to the projection timing which is subject to processing. In step S114, the projection timings regarded as being identical are simultaneously subject to processing in step S115.

The print data generating unit 204 generates print data using the image data acquired in step S115 (step S116). The print data generating unit 204 repeatedly performs the processes of steps S115 and S116 a number of times corresponding to the number of projection timings to thereby generate a number of print data items corresponding to the number of the projection timings based on plural projection information items correlated with the same presentation information.

An embodiment in which when generating print data, the print data is generated after the size used for printing respective image data is adjusted to a size corresponding to an image size of the image data or the projection size thereof may be employed. Moreover, an embodiment in which the print data is generated after the image size of other image data is adjusted so as to comply with the image size of reference image data may be employed. For example, the image sizes can be equalized by enlarging or reducing the aspect ratio of other image data so as to comply with the vertical or horizontal size of reference image data.

Hereinafter, an operation example of a print data generating process according to the present embodiment will be described with reference to FIGS. 13 to 17.

Figure 14:
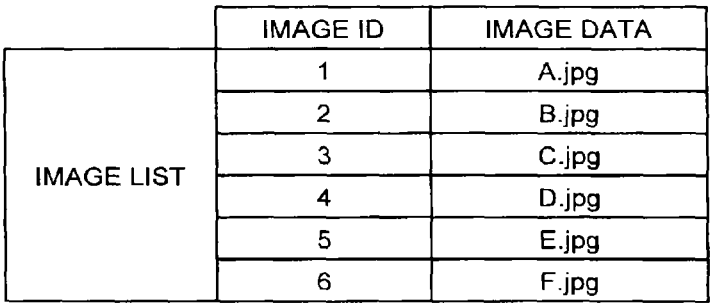
FIG. 14 is a diagram illustrating an example of an image list stored in a storage unit.
Figure 15:
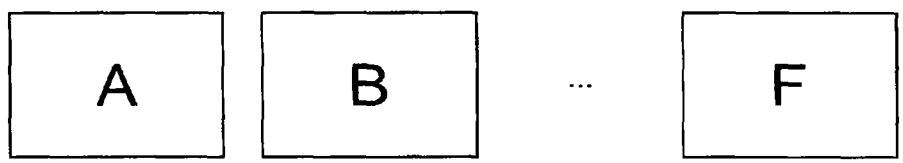
FIG. 15 is a diagram illustrating an example of image data.

FIG. 13 is a diagram illustrating an example of the presentation information stored in the projection information management unit 202. Here, FIG. 13 illustrates projection information generated by each of two projectors 100 (hereinafter denoted as "device 1" and "device 2"). FIG. 14 is a diagram illustrating an example of the image list stored in the storage unit 210. The image list of FIG. 14 illustrates an example in which image data items of image IDs 1 to 6 are registered. In the image data of the image IDs 1 to 6, it is assumed that the same character as the file name thereof is depicted at the center as illustrated in FIG. 15 (the same applies to FIGS. 19 and 23).

After receiving the presentation information illustrated in FIG. 13 and the image list (image data) illustrated in FIG. 14, the print data generating unit 204 extracts the projection timings of respective image data in a time-sequential order for each of the projection information items included in the presentation information based on the projection period included in respective display information items.

Figure 16:
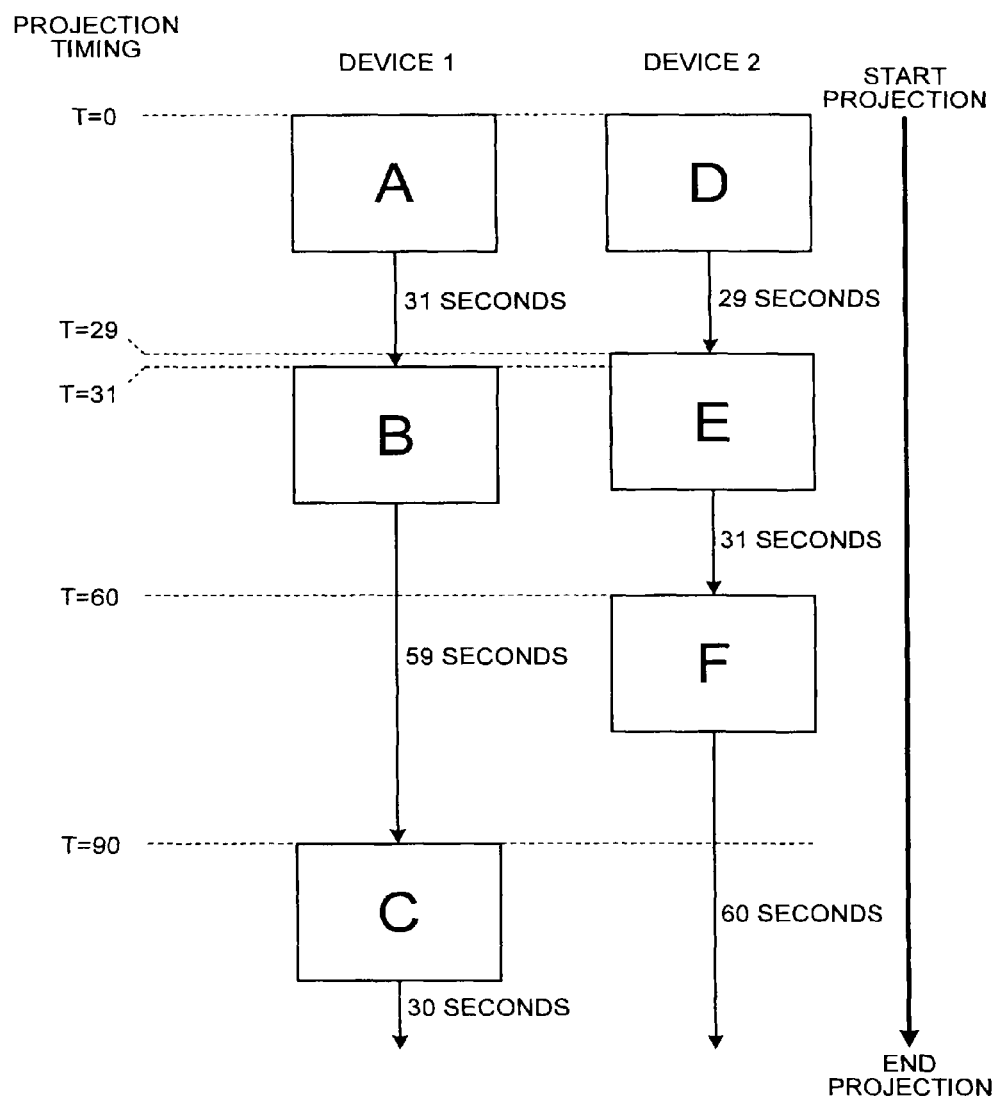
FIG. 16 is a diagram illustrating an example of the timing of projecting image data.

In the case of the presentation information of FIG. 13, the projection timings of respective image data can be expressed as illustrated in FIG. 16 from the transition of projection periods in the respective projection information items. Here, FIG. 16 is a diagram illustrating an example of a projection timing of image data. FIG. 16 illustrates an example in which projection display of image data A and D starts in the devices 1 and 2, respectively, at time T=0 second, projection display of image data E starts in the device 2 at time T=29 seconds, projection display of image data B starts in the device 1 at time T=31 seconds, projection display of image data F starts in the device 2 at time T=60 seconds, and projection display of image data C starts in the device 1 at time T=90 seconds. In this case, the print data generating unit 204 extracts the timings T=0 second, 31 seconds, and 90 seconds from the projection information of the device 1 and the timings T=0 second, 29 seconds, and 60 seconds from the projection information of the device 2 as the projection timings.

Subsequently, the print data generating unit 204 compares the projection timing extracted from the projection information of the device 1 with the projection timing extracted from the projection information of the device 2 and determines whether image IDs of which projection is started at approximately identical timing are present. Here, if the threshold value serving as an index used for determining approximate identicalness is set to "within 3 seconds," the print data generating unit 204 determines that in the projection timings illustrated in FIG. 16, the timings T=0 second are identical, and the timings T=29 seconds and T=31 seconds are approximately identical. The print data generating unit 204 performs processing by regarding the timings T=0 as identical timings and the timings T=29 and T=31 as identical timings, for example, as T=30 or the like. As a result, the print data generating unit 204 starts generating print data at four projection timings of T=0 second, 30 seconds, 60 seconds, and 90 seconds. Since the timing T=0 is the same value in the devices 1 and 2, a process of merging the timings may not be performed explicitly.

Subsequently, the print data generating unit 204 generates 4 pages of print data as illustrated in FIG. 17 by using the image data corresponding to the image IDs which were projected and displayed at the projection timings of T=0 second, 30 seconds, 60 seconds, and 90 seconds. Here, FIG. 17 is a diagram illustrating an example of print data. The first page illustrates an example in which image data (A.jpg and D.jpg) projected and displayed in respective devices at the projection timing of T=0 second are allocated, and the second page illustrates an example in which image data (B.jpg and E.jpg) projected and displayed in respective devices at the projection timings of T=29 seconds and T=31 seconds regarded as the identical timing are allocated. Moreover, the third page illustrates an example in which image data (B.jpg and F.jpg) projected and displayed in respective devices at the projection timing of T=60 seconds are allocated, and the fourth page illustrates an example in which image data (C.jpg and F.jpg) projected and displayed in respective devices at the projection timing of T=90 seconds are allocated.

As above, according to the present embodiment, the print data generating device 200 stores the projection information including one or plural display information items generated whenever projection display of image data is performed by each of the projectors 100 so as to be associated with other projection information having a predetermined relation with the projection information using presentation information. When there is a print request designating certain presentation information, the print data generating device 200 generates print data using projection information belonging to the presentation information. In this way, image data which are projected and displayed using one projector plural times or using plural projectors can be printed at a time while reflecting the state at the time of performing projection display.

The print data generating device 200 extracts the projection timings when projection display of respective image data is started based on the projection period for each of the image data included in the respective display information items within the projection information and generates print data in a time-sequential order by merging approximately identical projection timings. In this way, it is possible to generate print data in which a projection order of image data and the projection period thereof when each of the projection information items is generated are reflected. Thus, it is possible to print into a configuration intended by a user (presenter) who performs projection display.

The print data generating device 200 generates print data in which a number of image data corresponding to the number of projection information items included in the presentation information are allocated in the same region. In this way, it is possible to check image data which are projected and displayed at approximately identical projection timings at a time. In particular, when projection display is performed simultaneously using plural projectors, it is possible to generate print data in which the state at the time of projecting the image data which is subject to the projection display is reflected. Thus, it is possible to print in a configuration intended by a user (presenter) who performs projection display.

In the above example, although a case where projection display is continuously performed in the devices 1 and 2 has been described, the present embodiment is not limited to this, but projection display may be stopped in any one of the devices. Hereinafter, this embodiment will be described with reference to FIGS. 18 and 19.

Figure 18:
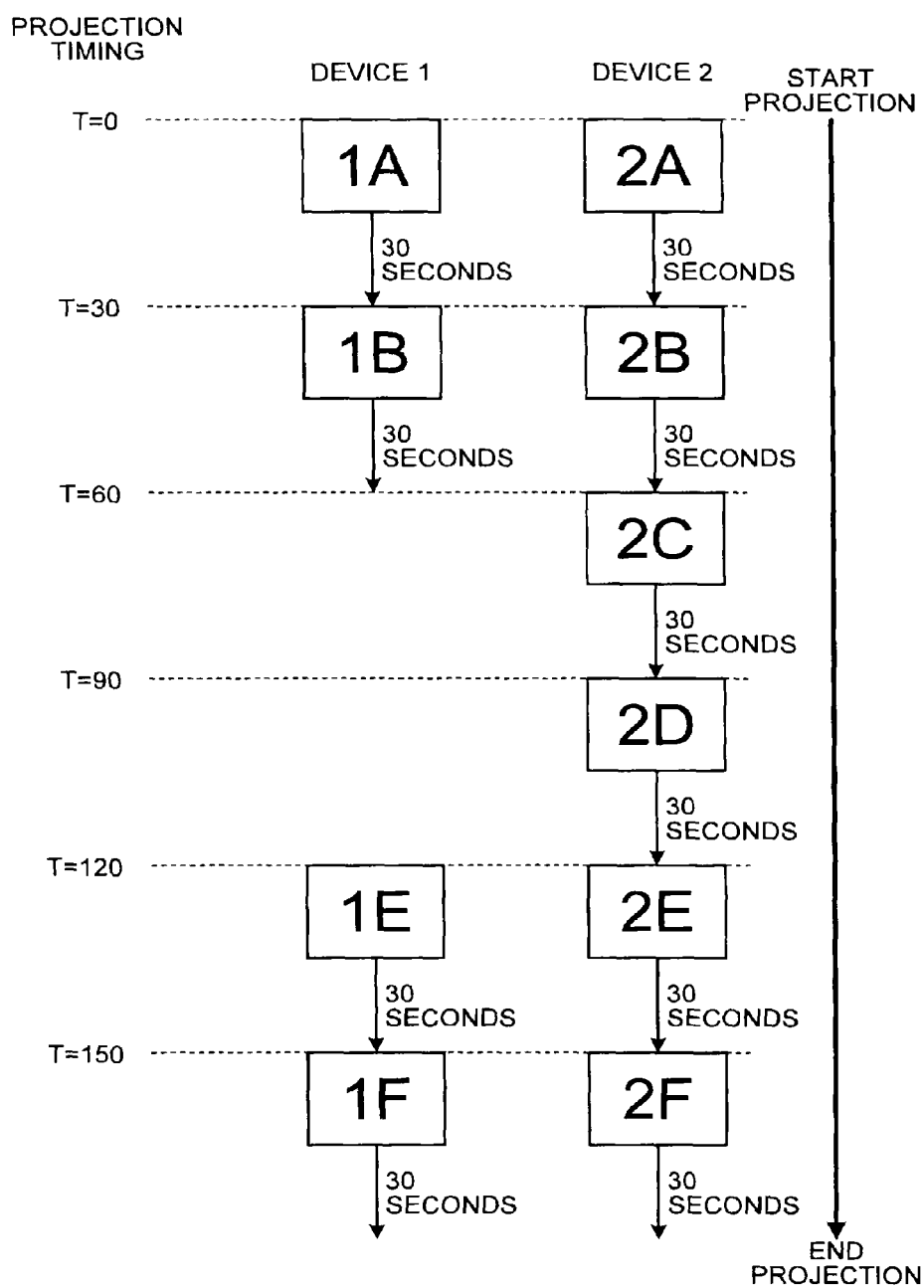
FIG. 18 is a diagram illustrating an example of the timing of projecting image data.

FIG. 18 is a diagram illustrating an example of the projection timing of image data. As illustrated in FIG. 18, projection display of image data 1A and 2A starts in the devices 1 and 2, respectively, at time T=0 second, and projection display of image data 1B and 2B starts in the devices 1 and 2, respectively, at time T=30 seconds. Moreover, in the device 1, projection display is stopped 30 seconds (time T=60) after the start of projection of the image data 1B, projection display of image data 1E starts as new projection display at time T=120 seconds occurring 60 seconds after the time T=60 seconds, and projection display of image data 1F starts at time T=150 seconds. On the other hand, in the device 2, projection display of image data 2C starts 30 seconds (time T=60 seconds) after the start of projection of image data 2B, and projection display of image data 2D, 2E, and 2F starts sequentially at time T=90 seconds, 120 seconds, and 150 seconds, respectively. The presentation information items corresponding to the projection timings of FIG. 18 are stored in the projection information management unit 202 of the print data generating device 200, and image data used for the projection of FIG. 18 are registered in the image list of the storage unit 210.

As illustrated in FIG. 18, when the device 1 performs projection plural times (two times) during a period where the device 2 performs projection once, print data are generated using the image data which are projected and displayed by both devices in the periods (between 0 and 60 seconds and after 120 seconds) where both the devices 1 and 2 perform projection at a time. Moreover, print data are generated using only the image data (image data 2C and 2D) which are projected and displayed by the device 2 in the period (between 60 and 120 seconds) where projection is stopped in the device 1.

Here, FIG. 19 is a diagram illustrating an example of print data corresponding to the projection timings of FIG. 18. Here, the first page illustrates an example in which image data (1A.jpg and 2A.jpg) projected and displayed in respective devices at the projection timing of T=0 second are allocated, and the second page illustrates an example in which image data (1B.jpg and 2B.jpg) projected and displayed in respective devices at the projection timing of T=30 seconds are allocated. Moreover, the third and fourth pages illustrate an example in which image data (2C.jpg and 2D.jpg) projected and displayed in the device 2 at the projection timings of T=60 seconds and T=90 seconds are allocated, and a region to which the image data of the device 1 is allocated is empty. Furthermore, the fifth page illustrates an example in which image data (1E.jpg and 2E.jpg) projected and displayed in respective devices at the projection timing of T=120 seconds are allocated, and the sixth page illustrates an example in which image data (1F.jpg and 2F.jpg) projected and displayed in respective devices at the projection timing of T=150 seconds are allocated.

As above, when a series of projection display is performed by plural projectors 100, if projection display is stopped in a certain projector 100, print data are generated using image data projected and displayed by the projector 100 which is continuously performing projection display in the stopped period. In this way, when a series of projection display is performed by plural projectors 100, even if a certain projector 100 performs projection plural times, image data corresponding to the projection content can be printed easily.

In FIG. 17 (FIG. 19), although an embodiment in which print data is generated in a 2-in-1 mode in accordance with the number (see FIG. 13) of projection information items included in the presentation information, the present embodiment is not limited to this. When other printing method such as a 4-in-1 mode is designated in the print request, the print data is generated in accordance with the designated printing method.

In the present embodiment, although the projection timing is extracted from all projection periods regardless of the magnitude of the projection period, the present embodiment is not limited to this. An embodiment in which projection timings of which projection period is shorter than a predetermined threshold value are excluded from the projection display timing extraction subject may be employed. Hereinafter, this embodiment will be described as a modified example of the present embodiment with reference to FIGS. 20 to 23.

FIG. 20 is a diagram illustrating an example of the presentation information stored in the projection information management unit 202. Here, FIG. 20 illustrates projection information generated in each of two projectors 100 (hereinafter denoted as "device 1" and "device 2"). FIG. 21 is a diagram illustrating an example of the image list stored in the storage unit 210. The image list of FIG. 21 illustrates an example in which image data items of image IDs 1 to 11 are registered.

After receiving the presentation information illustrated in FIG. 13 and the image list (image data) illustrated in FIG. 14, the print data generating unit 204 extracts the projection timings of respective image data in a time-sequential order for each of the projection information items included in the presentation information based on the projection period included in respective display information items.

Figure 22:
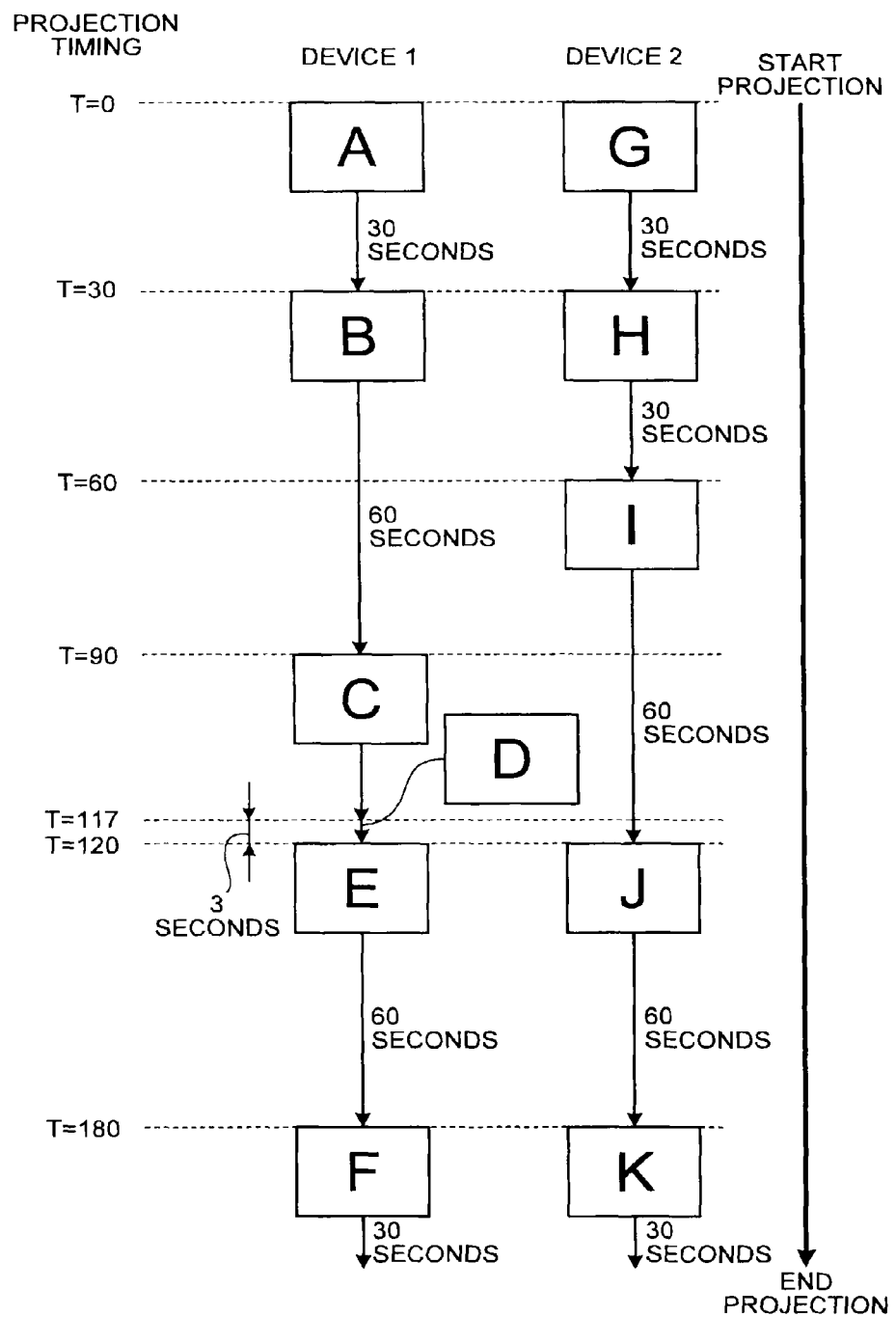
FIG. 22 is a diagram illustrating an example of the timing of projecting image data.

In the case of the presentation information of FIG. 20, the projection timings of respective image data can be expressed as illustrated in FIG. 22 from the transition of projection periods in the respective projection information items. Here, FIG. 22 is a diagram illustrating an example of a projection timing of image data. FIG. 22 illustrates an example in which projection display of image data A and G starts in the devices 1 and 2, respectively, at time T=0 second, projection display of image data B and H starts in the devices 1 and 2, respectively, at time T=30 seconds, projection display of image data I starts in the device 2 at time T=60 seconds, projection display of image data C starts in the device 1 at time T=90 seconds, projection display of image data D starts in the device 1 at time T=117 seconds, projection display of image data E and J starts in the devices 1 and 2, respectively, at time T=120 seconds, and projection display of image data F and K starts in the devices 1 and 2, respectively, at time T=180 seconds.

In the case of this modified example, the print data generating unit 204 excludes projection timings of which projection period is shorter than a predetermined threshold value are excluded from an extraction subject. Here, if the threshold value is shorter than 5 seconds, for example, the projection timing of the image data D projected and displayed in the device 1 at time T=117 seconds is excluded. As a result, the print data generating unit 204 extracts the timings T=0 second, 30 seconds, 90 seconds, 120 seconds, and 180 seconds from the projection information of the device 1 and the timings T=0 second, 30 seconds, 60 seconds, 120 seconds, and 180 seconds from the projection information of the device 2 as the projection timings.

Subsequently, the print data generating unit 204 compares the projection timing extracted from the projection information of the device 1 with the projection timing extracted from the projection information of the device 2 and determines whether image IDs of which projection is started at approximately identical timing are present. The projection timings of T=0 seconds, 30 seconds, 120 seconds, and 180 seconds are determined to be identical projection timings. As a result, the print data generating unit 204 starts generating print data at six projection timings of T=0 second, 30 seconds, 60 seconds, 90 seconds, 120 seconds, and 180 seconds.

Subsequently, the print data generating unit 204 generates 6 pages of print data as illustrated in FIG. 23 by using the image data corresponding to the image IDs which were projected and displayed at the projection timings of T=0 second, 30 seconds, 60 seconds, 90 seconds, 120 seconds, and 180 seconds. Here, FIG. 23 is a diagram illustrating an example of print data. The first page illustrates an example in which image data (A.jpg and G.jpg) projected and displayed in respective devices at the projection timing of T=0 second are allocated, and the second page illustrates an example in which image data (B.jpg and H.jpg) projected and displayed in respective devices at the projection timing of T=30 seconds are allocated. Moreover, the third page illustrates an example in which image data (B.jpg and I.jpg) projected and displayed in respective devices at the projection timing of T=60 seconds are allocated, and the fourth page illustrates an example in which image data (C.jpg and I.jpg) projected and displayed in respective devices at the projection timing of T=90 seconds are allocated. Furthermore, the fifth page illustrates an example in which image data (E.jpg and J.jpg) projected and displayed in respective devices at the projection timing of T=120 seconds are allocated, and the sixth page illustrates an example in which image data (F.jpg and K.jpg) projected and displayed in respective devices at the projection timing of 180 seconds are allocated.

As above, according to this modified example, image data of which projection period is short can be excluded from the subject to be printed. In this way, for example, image data which was not the subject at the time of projection and image data which was projected due to an operation error can be excluded from the subject to be printed. Thus, it is possible to improve convenience.

Second Embodiment

Next, an information display system according to a second embodiment will be described. The configuration of the information display system according to the present embodiment is the same as the configuration of the first embodiment described above except that a predetermined function is added to the print data generating unit 204. Therefore, detailed description thereof will not be provided. In the information display system of the second embodiment, the print data generating process performed by the print data generating device 200 is different from that of the first embodiment. Hereinafter, a print data generating process according to the second embodiment will be described with reference to FIG. 24. The print data generating unit according to the present embodiment will be denoted as a print data generating unit 204A in order to differentiate from the print data generating unit 204 according to the first embodiment.

Figure 24:
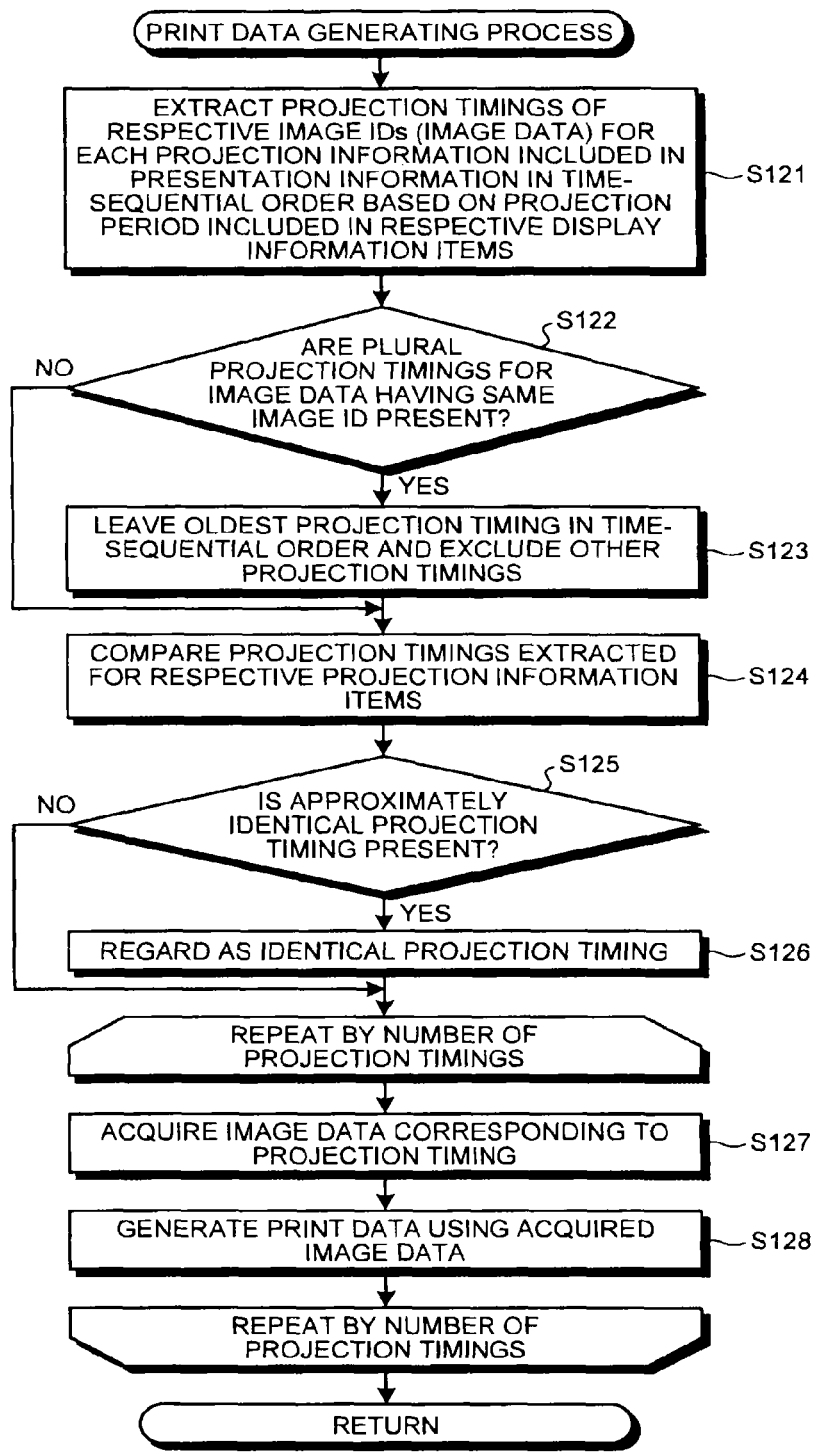
FIG. 24 is a flowchart illustrating the flow of a print data generating process according to a second embodiment.

FIG. 24 is a flowchart illustrating the flow of a print data generating process according to the second embodiment. First, the print data generating unit 204A extracts the timing of projecting respective image IDs (image data) in a time-sequential manner for each of the projection information items included in the presentation information based on a projection period included in respective display information (step S121).

Subsequently, the print data generating unit 204A determines whether there are plural projection timings for image data having the same image ID among the projection timings for each of the extracted projection information items (step S122). Here, when it is determined that there are plural projection timings (Yes in step S122), the oldest projection timing in the time-sequential order is left and the other projection timings are excluded (step S123). Then, the flow proceeds to step S124. When it is determined in step S122 that there are not plural projection timings (No in step S122), the flow proceeds immediately to step S124. The processes of steps S124 to S128 are the same as the processes of steps S112 to S116 described above, and hence, description thereof will not be provided.

Hereinafter, an operation example of the print data generating process according to the present embodiment will be described with reference to FIGS. 25 to 28.

FIG. 25 is a diagram illustrating an example of the presentation information stored in the projection information management unit 202. Here, FIG. 25 illustrates projection information generated by each of two projectors 100 (hereinafter denoted as "device 1" and "device 2"). FIG. 25 is a diagram illustrating an example of the image list stored in the storage unit 210. The image list of FIG. 26 illustrates an example in which image data items of image IDs 1 to 7 are registered.

After receiving the presentation information illustrated in FIG. 25 and the image list (image data) illustrated in FIG. 26, the print data generating unit 204A extracts the projection timings of respective image data in a time-sequential order for each of the projection information items included in the presentation information based on the projection period included in respective display information items.

Figure 27:
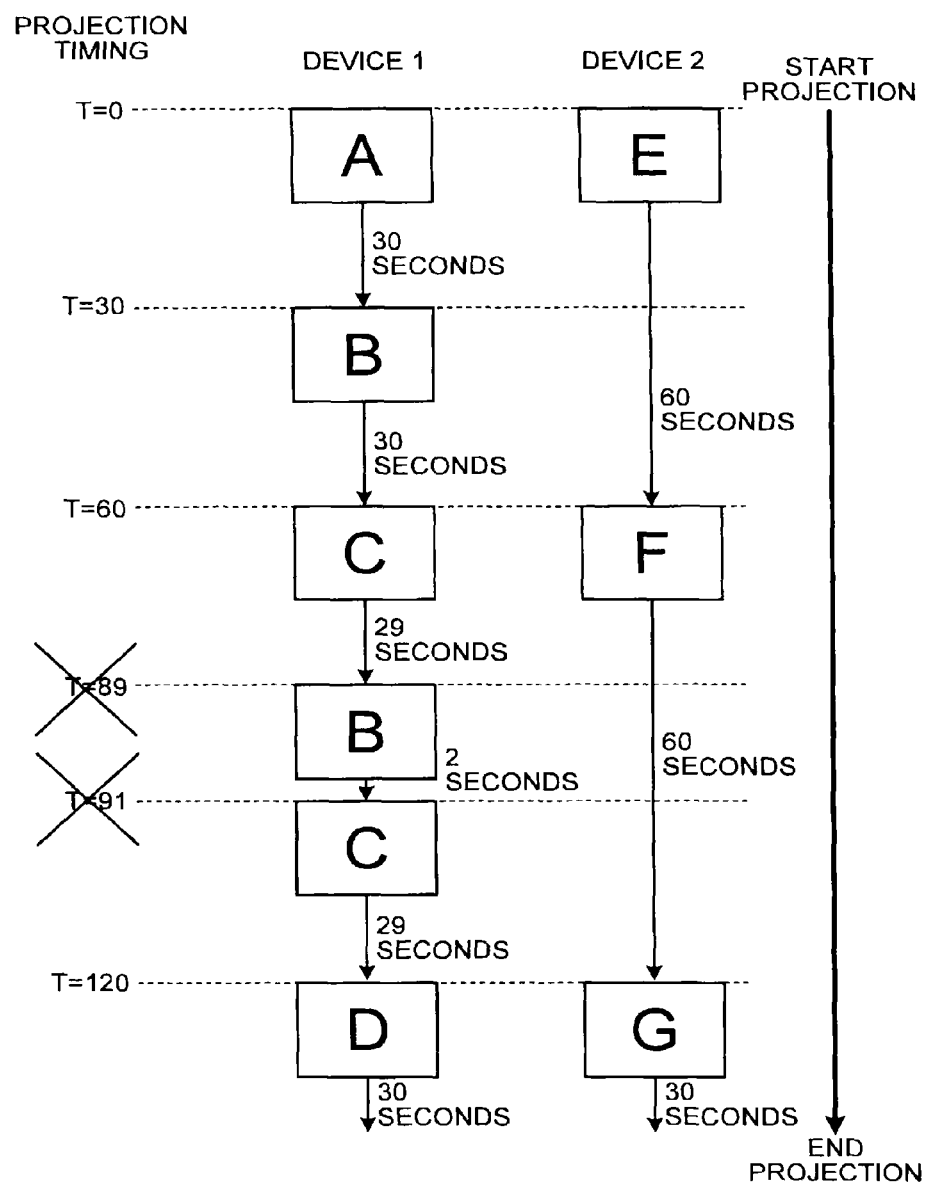
FIG. 27 is a diagram illustrating an example of the timing of projecting image data.

In the case of the presentation information of FIG. 25, the projection timings of respective image data can be expressed as illustrated in FIG. 27 from the transition of projection periods in the respective projection information items. Here, FIG. 27 is a diagram illustrating an example of a projection timing of image data. FIG. 27 illustrates an example in which projection display of image data A and E starts in the devices 1 and 2, respectively, at time T=0 second, projection display of image data B starts in the device 1 at time T=30 seconds, projection display of image data C and F starts in the devices 1 and 2 at time T=60 seconds, projection display of image data B starts in the device 1 at time T=89 seconds, projection display of image data C starts in the device 1 at time T=91 seconds, and projection display of image data D and G starts in the devices 1 and 2, respectively, at time T=120 seconds. In this case, the print data generating unit 204A extracts the timings T=0 second, 30 seconds, 60 seconds, 89 seconds, 91 seconds, and 120 seconds from the projection information of the device 1 and the timings T=0 second, 60 seconds, and 120 seconds from the projection information of the device 2 as the projection timings.

The print data generating unit 204A determines whether there are plural projection timings for the same image IDs (image data) among the projection timings for each of the extracted projection information items. Here, in the case of the projection timings illustrated in FIG. 27, since there are plural projection timings for the image data B and C of the device 1, the time of T=30 seconds and 60 seconds are left, and the time of T=89 seconds and 91 seconds are excluded from the projection timings. As a result, the time of T=0 second, 30 seconds, 60 seconds, and 120 seconds are the projection timings extracted from the projection information of the device 1.

Subsequently, the print data generating unit 204A compares the projection timing extracted from the projection information of the device 1 with the projection timing extracted from the projection information of the device 2 and determines whether image IDs of which projection is started at approximately identical timing are present. The projection timings of T=0 seconds, 60 seconds, and 120 seconds are determined to be identical projection timings. As a result, the print data generating unit 204A starts generating print data at four projection timings of T=0 second, 30 seconds, 60 seconds, and 120 seconds.

Subsequently, the print data generating unit 204A generates 4 pages of print data as illustrated in FIG. 28 by using the image data corresponding to the image IDs which were projected and displayed at the projection timings of T=0 second, 30 seconds, 60 seconds, and 120 seconds. Here, FIG. 28 is a diagram illustrating an example of print data. The first page illustrates an example in which image data (A.jpg and E.jpg) projected and displayed in respective devices at the projection timing of T=0 second are allocated, and the second page illustrates an example in which image data (B.jpg and E.jpg) projected and displayed in respective devices at the projection timing of T=30 seconds are allocated. Moreover, the third page illustrates an example in which image data (C.jpg and F.jpg) projected and displayed in respective devices at the projection timing of T=60 seconds are allocated, and the fourth page illustrates an example in which image data (D.jpg and G.jpg) projected and displayed in respective devices at the projection timing of T=120 seconds are allocated.

As above, according to the present embodiment, it is possible to prevent redundant image data from being printed. Thus, it is possible to eliminate wastefulness and to generate print data in which the state at the time of projection is reflected more appropriately.

In the present embodiment, although the projection timing is excluded based on the identicalness of the image data (image IDs) projected and displayed, the present embodiment is not limited to this. An embodiment in which the projection timing is excluded based on a display information operation content "Return" may be employed. In the case of the embodiment in which the projection timing is excluded based on the information of the operation content, when "Proceed" is pressed again after projection is performed for a predetermined period or longer after "Return" is pressed, for example, it may be determined that presentation has been made for image data which is the subject of the "Return" operation. In this way, the projection timing of the present image data may be left.

In the present embodiment, although the projection display timing when the same image data has been projected and displayed two or more times is excluded, the present embodiment is not limited to this. The projection display may be allowed up to a predetermined number of times, and when the number of times of projection exceeds a predetermined number of times (for example, three times), the projection display timing later than the predetermined number of times may be excluded.

Third Embodiment

Next, an information display system according to a third embodiment will be described. The configuration of the information display system according to the present embodiment is the same as the configuration of the first embodiment described above except that a predetermined function is added to the print data generating unit 204. Therefore, detailed description thereof will not be provided. In the information display system of the third embodiment, the print data generating process performed by the print data generating device 200 is different from that of the first embodiment. Hereinafter, a print data generating process according to the third embodiment will be described with reference to FIG. 29. The print data generating unit according to the present embodiment will be denoted as a print data generating unit 204B in order to differentiate from the print data generating unit 204 according to the first embodiment.

Figure 29:
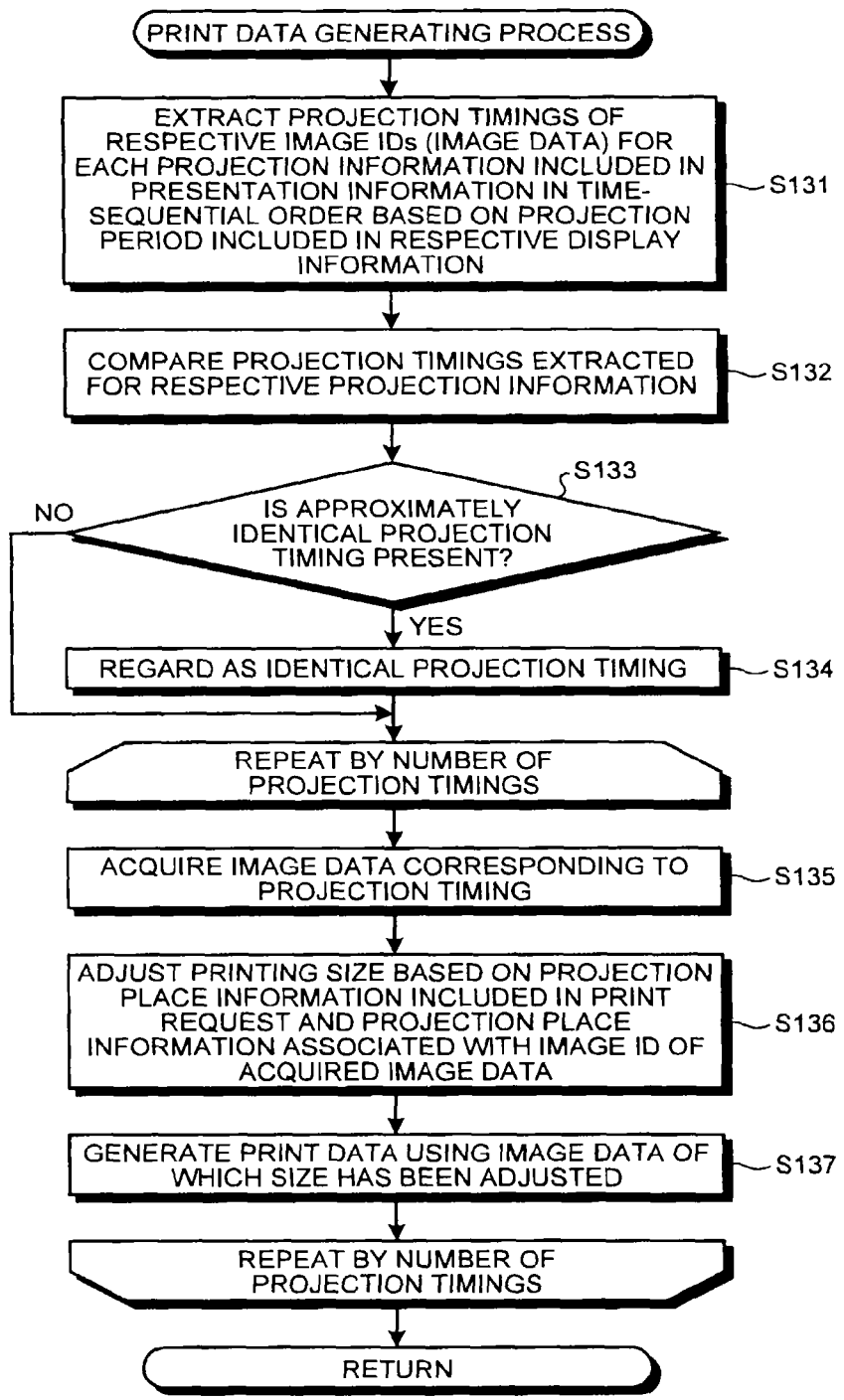
FIG. 29 is a flowchart illustrating the flow of a print data generating process according to a third embodiment.

FIG. 29 is a flowchart illustrating the flow of a print data generating process according to the third embodiment. As a precondition to the present embodiment, it is assumed that projection place information representing the projection place of the projector 100 is included in the print request transmitted from the projector 100.

First, the print data generating unit 204B extracts the timing of projecting respective image IDs (image data) in a time-sequential manner for each of the projection information items included in the presentation information based on a projection period included in respective display information (step S131). Subsequently, the print data generating unit 204B compares the projection timings extracted for respective projection information items (step S132) and determines whether approximately identical projection timings are present (step S133).

When it is determined in step S133 that approximately identical projection timings are present (Yes in step S133), the print data generating unit 204B regards the corresponding projection timing as identical projection timing (step S134). Then, the flow proceeds to step S135. When it is determined in step S134 that approximately identical projection timings are not present (No in step S134), the flow proceeds immediately to step S135.

Subsequently, the print data generating unit 204B repeatedly executes the processes of steps S135 to S137 below a number of times corresponding to the number of extracted projection timings in a time-sequential order.

The print data generating unit 204B acquires image data corresponding to a projection timing which is subject to processing (step S135). Subsequently, the print data generating unit 204B adjusts the printing size based on the projection place information included in the print request and the projection place information associated with the image ID of the respective acquired image data (step S136) and generates print data using these image data (step S137).

Specifically, the print data generating unit 204B adjusts the printing size so that image data of which projection place information of the display information (or the projection information) in which the image ID of the image data is registered is identical to the projection place information included in the print request among the acquired image data is printed in a larger size than the other image data. In this way, the image data of which projection place information is identical to the projection place information included in the print request is emphasized.

The print data generating unit 204 repeatedly performs the processes of steps S135 to S137 a number of times corresponding to the number of projection timings. In this way, the image data projected and displayed in the projection place of the projector 100 having transmitted the print request can be generated so that the print data is emphasized more than the image data projected and displayed in the other projection places.

Hereinafter, an operation example of the print data generating process according to the present embodiment will be described with reference to FIGS. 13, 14, 16, 30, and 31.

First, it is assumed that the presentation information stored in the projection information management unit 202 is in the state illustrated in FIG. 13. Moreover, it is assumed that the image list stored in the storage unit 210 is in the state illustrated in FIG. 14.

In the case of the presentation information of FIG. 13, the projection timings of respective image data can be expressed as illustrated in FIG. 16 from the transition of projection periods in the respective projection information items. The print data generating unit 204 determines whether image IDs of which projection is started at approximately identical timing are present, and determines that the timings T=0 second are identical, and the timings T=29 seconds and T=31 seconds are approximately identical. The print data generating unit 204 performs processing by regarding the timings T=29 and T=31 as identical timings, for example, as T=30 or the like. As a result, the print data generating unit 204 determines the four timings of T=0 second, 30 seconds, 60 seconds, and 90 seconds as the number of timings at which print data are generated.

Subsequently, the print data generating unit 204 starts generating print data using the image data corresponding to the image IDs which were projected and displayed at the timings of T=0 second, 30 seconds, 60 seconds, and 90 seconds. Here, when the projection place information included in the print request is "Conference Room A", the print data generating unit 204 determines from the projection information of the device 1 of FIG. 13 that the projection place information of the image IDs 1 to 3 corresponding to the image data A, B, and C is "Conference Room A" and adjusts the size used for printing these image data A, B, and C so as to be larger than that of the image data D, E, and F. Moreover, when the projection place information included in the print request is "Conference Room B", the print data generating unit 204 determines from the projection information of the device 2 of FIG. 13 that the projection place information of the image IDs 4 to 6 corresponding to the image data D, E, and F is "Conference Room B" and adjusts the size used for printing the image data D, E, and F so as to be larger than that of the image data A, B, and C. Then, the print data generating unit 204 generates print data using the image data of which printing size is adjusted.

Here, FIG. 30 is a diagram illustrating an example of print data generated in accordance with the print request in which "Conference Room A" is included as projection place information. As illustrated in FIG. 30, the sizes of the image data A, B, and C are larger than the sizes of the image data D, E, and F. FIG. 31 is a diagram illustrating an example of print data generated in accordance with the print request in which "Conference Room B" is included in projection place information. As illustrated in FIG. 31, the sizes of the image data D, E, and F are larger than the sizes of the image data A, B, and C.

As above, according to the present embodiment, print data of which size of the image data is adjusted is generated in accordance with the projection place (installed place) of the projector 100 that output the print request. In this way, the image data projected and displayed in the projection place (installed place) of the projector 100 that output the print request can be printed in an emphasized state in accordance with the projection place. Thus, it can improve convenience.

In FIGS. 30 and 31, although the allocated position (the horizontal allocation position) of the image data in the print data is changed in accordance with the projection place information included in the print request, the present embodiment is not limited to this, and the image data may be allocated at a fixed position.

Figure 32:
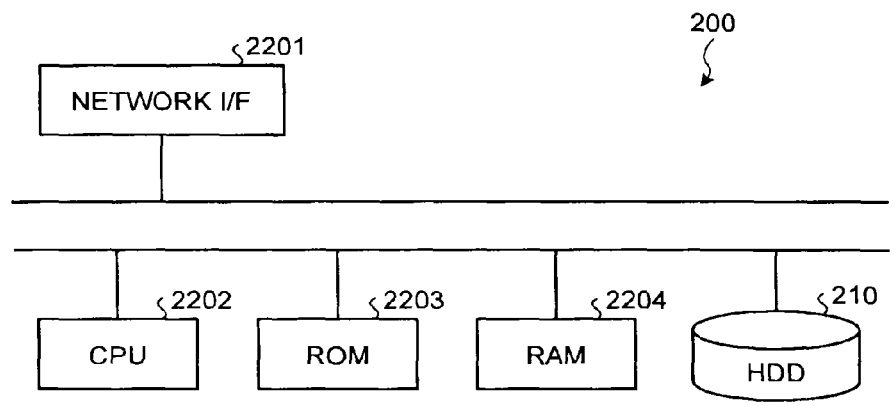
FIG. 32 is a block diagram illustrating a hardware configuration example of a print data generating device according to the first to third embodiments.

Next, a hardware configuration of the print data generating device 200 according to the first to third embodiments will be described. FIG. 32 is a block diagram illustrating a hardware configuration example of the print data generating device 200 according to the first to third embodiments.

The print data generating device 200 of the first to third embodiments mainly includes a CPU 2202, a storage device (for example, ROM (read only memory) 2203 and RAM 2204), an external storage device (for example, an HDD 210 or a storage unit 210 and a CD drive (not illustrated)), a display device (not illustrated) (for example, a display), an input device (not illustrated) (for example, a keyboard and a mouse), and a network I/F 2201. That is, the print data generating device 200 has a hardware configuration which uses a general computer.

A print data generation program executed by the print data generating device 200 according to the first to third embodiments is provided in a state of being recorded in a computer-readable recording medium, such as a CD-ROM (Compact Disk Read Only Memory), a flexible disk (FD), a CD-R (Compact Disk Recordable), or a DVD (Digital Versatile Disk), as files in an installable format or an executable format.

Moreover, the print data generation program executed by the print data generating device 200 according to the first to third embodiments may be stored on a computer connected to a network such as the Internet and provided by being downloaded through a network. In addition, the print data generation program executed by the print data generating device 200 according to the first to third embodiments may be provided or distributed through a network such as the Internet.

Furthermore, the print data generation program executed by the print data generating device 200 according to the first to third embodiments may be provided in a state of being stored in advance in the ROM 2203 or the like.

The print data generation program executed by the print data generating device 200 according to the first to third embodiments has a modular configuration which includes the above-described respective units (the communication unit, the projection information management unit, the document management unit, the print data generating unit, and the image data generating unit), and the CPU (processor) which is an actual hardware configuration reads the print data generation program from the recording medium and executes the print data generation program, whereby the respective units are loaded onto the main storage device such as the RAM 2204, and the communication unit, the projection information management unit, the document management unit, the print data generating unit, and the image data generating unit are generated on the main storage device.

Figure 33:
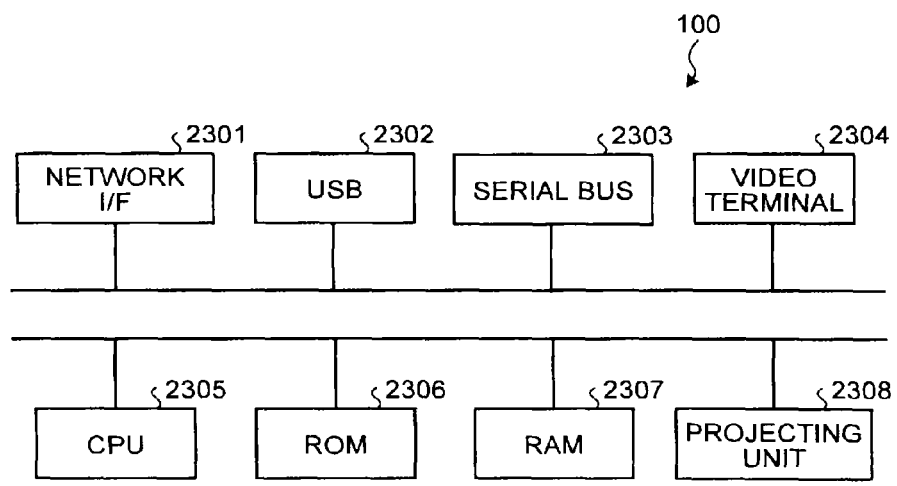
FIG. 33 is a block diagram illustrating a hardware configuration example of a projector according to the first to third embodiments.

Next, a hardware configuration of the projector 100 according to the first to third embodiments will be described. FIG. 33 is a block diagram illustrating a hardware configuration example of the projector 100 according to the first to third embodiments. As illustrated in FIG. 33, the projector 100 has a configuration in which a CPU (central processing unit) 2305, ROM 2306, RAM 2307, a projecting unit 2308, a video terminal 2304, a USB 2302, a serial bus 2303, and a network interface (I/F) 2301 are connected to a bus as main hardware configurations.

The CPU 2305 is a computation device that controls an overall process of the projector 100. The RAM 2307 stores data necessary for various processes performed by the CPU 2305. The ROM 2306 stores programs and the like for realizing various processes performed by the CPU 2305.

The projecting unit 2308 is a device that projects document data and is controlled by the projection display unit 104. The projecting unit 2308 enlarges and projects light emitted by a liquid crystal panel using an optical system including lenses, for example. The projection method by the projecting unit 2308 is not limited to this, and all projection methods used from the past such as a method using LEDs (light emitting diodes) as a light source can be applied.

The video terminal 2304 is an input terminal used when connecting to a PC or the like and receiving and projecting a video from the PC or the like. The network interface (I/F) 2301 is an interface for connecting to an external device such as the print data generating device 200 through a network and transmitting to and receiving data from the connected external device.

Various programs executed by the projector 100 according to the first to third embodiments are provided in a state of being stored in advance in the ROM 2306 or the like.

Various programs executed by the projector 100 according to the first to third embodiments may be provided in a state of being recorded in a computer-readable recording medium, such as a CD-ROM (Compact Disk Read Only Memory), a flexible disk (FD), a CD-R (Compact Disk Recordable), or a DVD (Digital Versatile Disk), as files in an installable format or an executable format.

Moreover, various programs executed by the projector 100 according to the first to third embodiments may be stored on a computer connected to a network such as the Internet and provided by being downloaded through a network. In addition, various programs executed by the projector 100 according to the first to third embodiments may be provided or distributed through a network such as the Internet.

Various programs executed by the projector 100 according to the first to third embodiments has a modular configuration which includes the above-described respective units (the communication unit, the projection information generating unit, and the projection display unit), and the CPU 2305 which is an actual hardware configuration reads the projection information generation program from the ROM 2306 and executes the projection information generation program, whereby the respective units are loaded onto the storage device such as the RAM 2307, and the communication unit, the projection information generating unit, and the projection display unit are generated on the main storage device.

While certain embodiments have been described, these embodiments have been presented by way of example only, and are not intended to limit the scope of the inventions. These embodiments can be embodied in a variety of other forms, and various omissions, substitutions, and changes can be made without departing from the spirit of the inventions. Moreover, the embodiments and modifications thereof fall within the scope and spirit of the inventions and fall within the scope of the inventions described in the claims and their equivalents.

For example, in the above embodiments, although an example, in which the image forming device is applied to the printing device, has been described, the present embodiment is not limited to this. The present embodiment can be applied to an image forming device such as a copying machine, a facsimile machine, or a multi-functional peripheral having at least two functions of a printer function, a scanner function, and a facsimile function.

In the above embodiments, although an embodiment in which projection place information is input through the operation unit 102 of the projector 100 has been described, the present invention is not limited to this. An embodiment in which the projector 100 includes a device for indoor position detection so as to automatically acquire an arrangement position (projection place information) of the subject device may be employed. In the above embodiments, although user information is input through the operation unit 102 of the projector 100, the present invention is not limited to this. An embodiment in which the projector 100 includes a device (for example, a biometric authentication device) for user authentication so as to input the user information through the device may be employed.

Moreover, the projector 100 may include the functions (the communication unit 201, the projection information management unit 202, the document management unit 203, the print data generating unit 204, the image data generating unit 205, and the storage unit 210) of the print data generating device 200. In this case, the projection display process, the printing process, and the like described above may be performed between the projector 100 having the functions of the print data generating device 200 and the projector 100 having a general configuration, for example.

In the above embodiments, although a configuration in which the projector 100 which is an information display (projecting) device is used as an example of the display control device controlling the display and output of image data has been described, the present invention is not limited to this. For example, an information display device having a display device such as a liquid crystal or organic EL or an information processing device such as a PC that controls the display of a display device which is an external device may be used.

Figure 34:
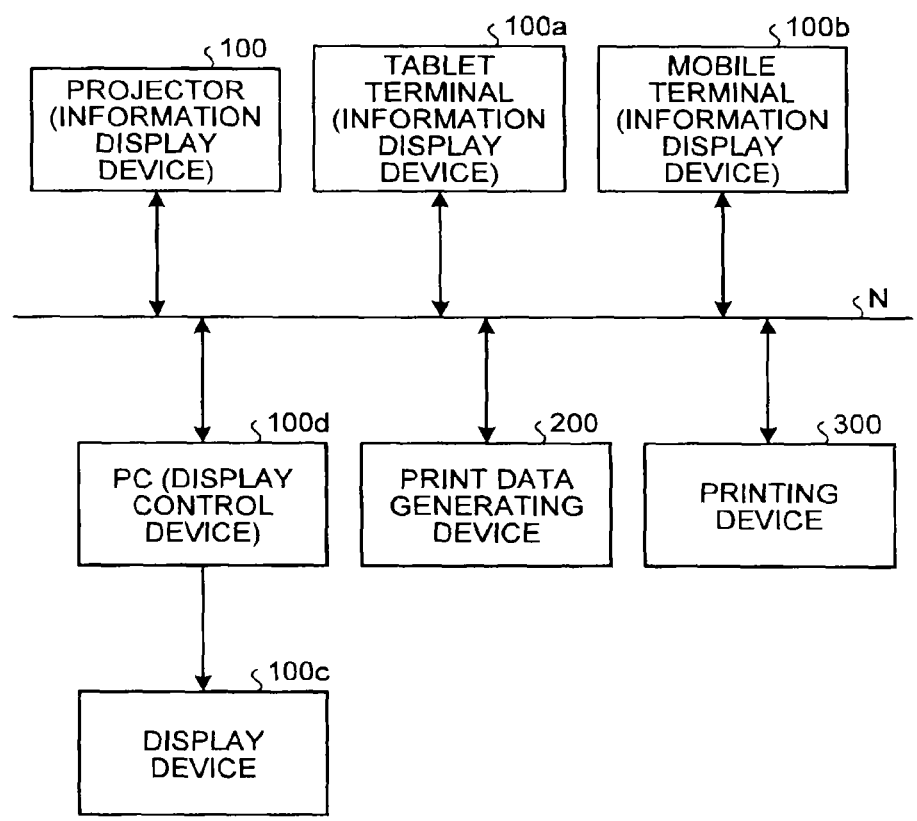
FIG. 34 is a diagram illustrating another configuration example of an information display system.

Here, FIG. 34 is a diagram illustrating another configuration example of an information display system. FIG. 34 illustrates a configuration example in which the information display system includes a tablet terminal 100a and a mobile terminal 100b as an information display device which is a display control device having a display device such as a liquid crystal or organic EL in addition to the projector 100, the print data generating device 200, and the printing device 300 described above. Moreover, FIG. 34 illustrates a configuration example in which the information display system includes a PC 100d as a display control device that controls the display of an externally attached display device 100c. In FIG. 34, the projector 100, the tablet terminal 100a, the mobile terminal 100b, and the PC 100d are connected to the print data generating device 200 through a wired or wireless network N. In the case of this configuration, each of the tablet terminal 100a, the mobile terminals 100b, and the PC 100d performs the same process as the projector 100. Each of the tablet terminal 100a, the mobile terminal 100b, and the PC 100d has the same functional configuration as the projector 100 in relation to the display control of image data.

In the above embodiments, although the projector 100 is configured to acquire image data to be output from display from the print data generating device 200, the present invention is not limited to this. The image data may be acquired from an image data supply device (for example, an information processing device such as a PC, a mobile terminal, or a tablet terminal and a storage device such as a USB memory) other than the print data generating device 200.

Figure 35:
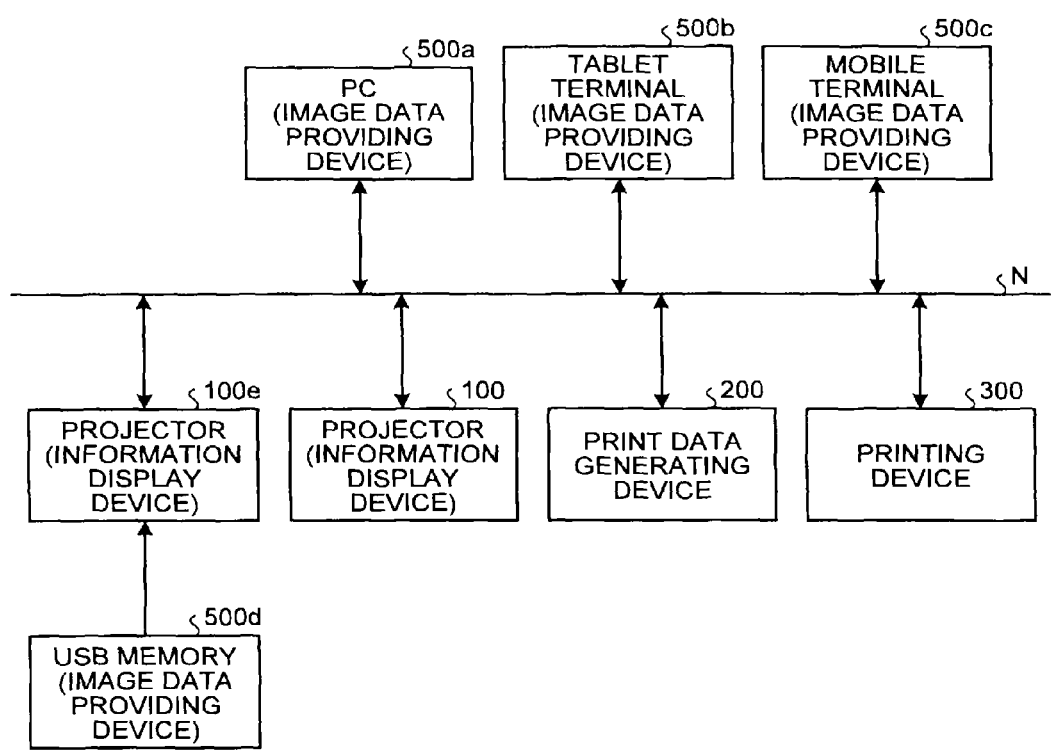
FIG. 35 is a diagram illustrating another configuration example of an information display system.

Here, FIG. 35 is a diagram illustrating another configuration example of the information display system. FIG. 35 illustrates a configuration example in which the information display system includes a PC 500a, a tablet terminal 500b, and a mobile terminal 500c as the image data supply device in addition to the projector 100 (100e), the print data generating device 200, and the printing device 300. Moreover, FIG. 35 illustrates an example in which a USB memory 500d which is an image data supply device is removably attached to the projector 100e through a USB interface (not illustrated). The respective devices are connected through a wired or wireless network N.

In the case of the configuration illustrated in FIG. 35, the projector 100 (100e) can acquire the image data held by the PC 500a, the tablet terminal 500b, and the mobile terminal 500c through a wired or wireless network N. Moreover, the projector 100e can acquire the image data held by the USB memory 500d. When the acquired image data are not converted into a displayable format, the projector 100 (100e) may convert the same into a displayable format, generate a list by generating image IDs for identifying the respective converted image data, and output display information including the image IDs to the print data generating device 200 together with the original image data. In this way, the subsequent process can be performed in a manner similar to the above embodiments.

In the above embodiments, although the print request is output from the projector 100 which is the display control device to the print data generating device 200, the present invention is not limited to this. The print request may be output from a print request output device (for example, an information processing device such as a PC, a mobile terminal, or a tablet terminal) other than the projector 100.

Figure 36:
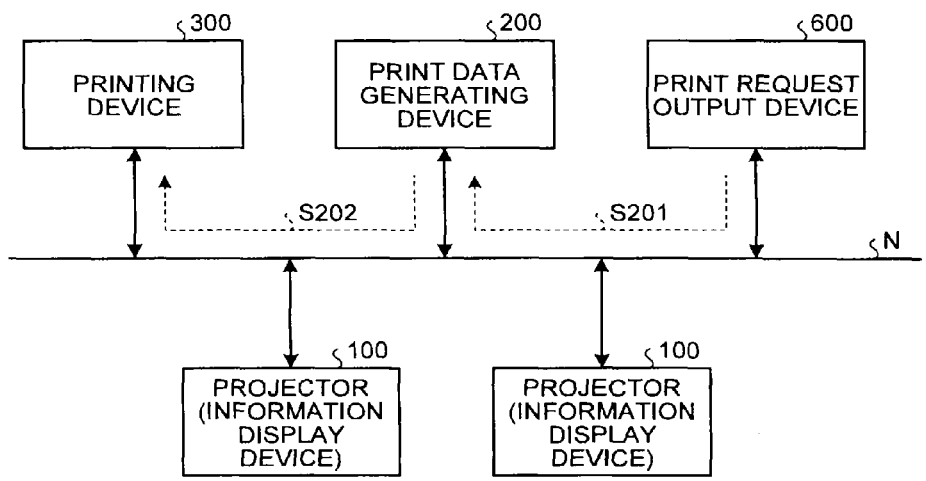
FIG. 36 is a diagram illustrating another configuration example of an information display system.

Here, FIG. 36 is a diagram illustrating another configuration example of the information display system. In FIG. 36, the information display system includes a print request output device 600 such as a PC or a tablet terminal in addition to the projector 100, the print data generating device 200, and the printing device 300, and the respective devices are connected through a wired or wireless network N.

In the case of the configuration illustrated in FIG. 36, upon acquiring (receiving) a list of presentation information items from the print data generating device 200 and receiving presentation information which is to be printed through an operation unit (not illustrated) or the like, the print request output device 600 transmits a print request requesting the printing of the received presentation information to the print data generating device 200 (step S201). Upon receiving the print request from the print request output device 600, the print data generating device 200 executes a print data generating process based on the presentation information instructed by the print request and transmits the generated print data to the printing device 300 (step S202). In this way, the print data is printed by the printing device 300.

Figure 37:
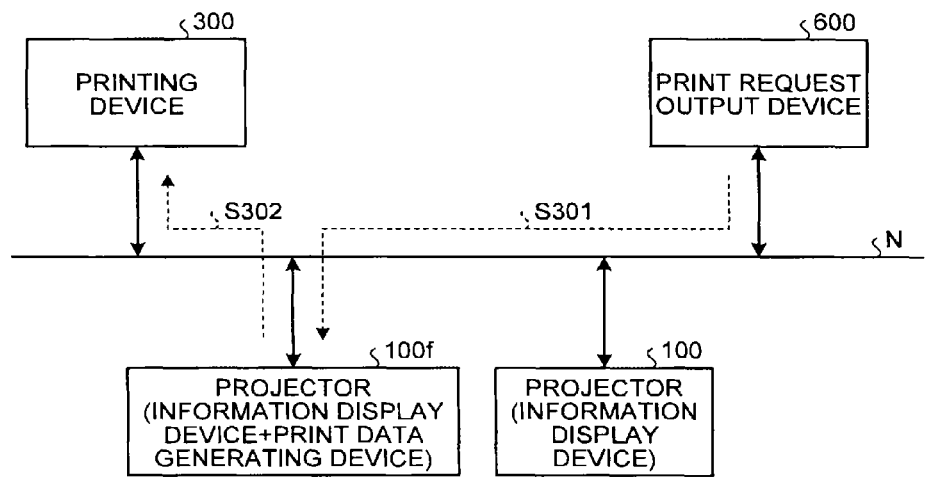
FIG. 37 is a diagram illustrating another configuration example of an information display system.

When the projector 100 has the function of the print data generating device 200, a configuration as illustrated in FIG. 37 is employed. Here, FIG. 37 is a diagram illustrating another configuration example of the information display system. In FIG. 37, a projector 100f has the function of the print data generating device 200 and is connected to a network N similarly to FIG. 36.

In the case of the configuration illustrated in FIG. 37, upon acquiring (receiving) a list of presentation information items from the projector 100f and receiving presentation information which is to be printed through an operation unit (not illustrated) or the like, the print request output device 600 transmits a print request requesting the printing of the received presentation information to the projector 100f (step S301). Upon receiving the print request from the print request output device 600, the projector 100f executes a print data generating process based on the presentation information instructed by the print request and transmits the generated print data to the printing device 300 (step S302). In this way, the print data is printed by the printing device 300.

According to the present embodiment, it can provide a display control device, an image formation data generating device, and an information display system capable of printing image data projected and displayed using one projector plural times or plural projectors at a time while reflecting the state at the time of performing projection display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image formation data generating device, comprising:
    a memory that stores a plurality of first images displayed by a first external device and a plurality of second images displayed by a second external device;
    a communication circuit that receives
        a print request from one of the first external device and the second external device,
        first projection information from the first external device, and
        second projection information from the second external device, wherein
    the first projection information from the first external device includes first projection timings of when the first images are displayed and the second projection information from the second external device includes second projection timings of when the second images are displayed; and
    an image formation data generating circuit that
        extracts the first projection timings from the first projection information received by the communication circuit and the second projection timings from the second projection information received by the communication circuit, in a time-sequential manner based on a display order and a display period of each of the first and second images,
        identifies a particular first image and a particular second image that are displayed within a predetermined amount of time from one another based on the first and second projection timings, and
        generates image formation data that includes the particular first image and the particular second image as allocated to a same page.

2. The image formation generating device according to claim 1, wherein
    the memory stores first information that represents the timing in which each first image is displayed by the first external device, and second information that represents the timing in which each second image is displayed by the second external device, and
    the image formation data generating circuit identifies the particular first image and the particular second image based on the timings of the first and second information.

3. The image formation generating device according to claim 2, wherein the first and second information include time information that represents the time when the particular first image and the particular second image are displayed.

4. The image formation generating device according to claim 1, wherein the particular first image is one of the plurality of first images and the particular second image is one of the plurality of second images.

5. The image formation data generating device according to claim 1, wherein
    the image formation data generating circuit omits the particular first image from the image formation data when the first projection timings indicate that the display period of the particular first image is less than a threshold time, and
    the image formation data generating circuit omits the particular second image from the image formation data when the second projection timings indicate that the display period of the particular second image is less than the threshold time.

6. The image formation data generating device according to claim 1, wherein
    when the first and second projection timings indicate that no second image is displayed within the predetermined amount of time from when a first image is displayed, the image formation data generating circuit generates the image formation data to include the first image, and
    when the first and second projection timings indicate that no first image is displayed within the predetermined amount of time from when a second image is displayed, the image formation data generating circuit generates the image formation data to include the second image.

7. The image formation data generating device according to claim 1, wherein
when the particular first image is repeatedly displayed, the image formation data generating circuit generates the image formation data to include a single copy of the particular first image, and
when the particular second image is repeatedly displayed, the image formation data generating circuit generates the image formation data to include a single copy of the particular second image.

8. A method for generating image formation data, the method comprising:
storing a plurality of first images displayed by a first external device and a plurality of second images displayed by a second external device;
receiving, by a communication circuit, a print request from one of the first external device and the second external device;
receiving, by the communication circuit, first projection information from the first external device and second projection information from the second external device, wherein the first projection information from the first external device includes first projection timings of when the first images are displayed and the second projection information from the second external device includes second projection timings of when the second images are displayed;
extracting, by an image formation data generating circuit, the first projection timings from the first projection information received by the communication circuit and the second projection timings from the second projection information received by the communication circuit, in a time-sequential manner based on a display order and a display period of each of the first and second images;
identifying, by the image formation data generating circuit, a particular first image and a particular second image that are displayed within a predetermined amount of time from one another based on the first and second projection timings; and
generating, by the image formation data generating circuit, image formation data that includes the particular first image and the particular second image as allocated to a same page.

9. The method according to claim 8, further comprising:
storing first information that represents the timing in which each first image is displayed by the first external device, and second information that represents the timing in which each second image is displayed by the second external device; and
identifying the particular first image and the particular second image based on the timings of the first and second information.

10. The method according to claim 9, wherein the first and second information include time information that represents the time when the particular first image and the particular second image are each displayed.

11. The method according to claim 8, wherein the particular first image is one of the plurality of first images and the particular second image is one of the plurality of second images.

12. The method according to claim 8, further comprising:
omitting the particular first image from the image formation data when the first projection timings indicate that the display period of the particular first image is less than a threshold time; and
omitting the particular second image from the image formation data when the second projection timings indicate that the display period of the particular second image is less than the threshold time.

13. The method according to claim 8, further comprising:
generating, when the first and second projection timings indicate that no second image is displayed within the predetermined amount of time from when a first image is displayed, the image formation data to include the first image; and
generating, when the first and second projection timings indicate that no first image is displayed within the predetermined amount of time from when a second image is displayed, the image formation data to include the second image.

14. The method according to claim 8, further comprising:
generating, when the particular first image is repeatedly displayed, the image formation data to include a single copy of the particular first image; and
generating, when the particular second image is repeatedly displayed, the image formation data to include a single copy of the particular second image.

15. A non-transitory computer readable medium storing computer readable instructions that, when executed by a computer including circuitry, cause the computer to:
store a plurality of first images displayed by a first external device and a plurality of second images displayed by a second external device;
receive a print request from one of the first external device and the second external device;
receive, by a communication circuit, first projection information from the first external device and second projection information from the second external device, wherein the first projection information from the first external device includes first projection timings of when the first images are displayed and the second projection information from the second external device includes second projection timings of when the second images are displayed;
extract the first projection timings from the first projection information received by the communication circuit and the second projection timings from the second projection information received by the communication circuit, in a time-sequential manner based on a display order and a display period of each of the first and second images;
identify a particular first image and a particular second image that are displayed within a predetermined amount of time from one another based on the first and second projection timings; and
generate image formation data that includes the particular first image and the particular second image as allocated to a same page.

16. The non-transitory computer readable medium according to claim 15, wherein the computer is further caused to:
store first information that represents the timing in which each first image is displayed by the first external device, and second information that represents the timing in which each second image is displayed by the second external device; and
identify the particular first image and the particular second image based on the timings of the first and second information.

17. The non-transitory computer readable medium according to claim 16, wherein the first and second information include time information that represents the time when the particular first image and the particular second image are displayed.

18. The non-transitory computer readable medium according to claim 15, wherein the particular first image is one of the plurality of first images and the particular second image is one of the plurality of second images.

19. The non-transitory computer readable medium according to claim 15, wherein the computer is further caused to:
   omit the particular first image from the image formation data when the first projection timings indicate that the display period of the particular first image is less than a threshold time; and
   omit the particular second image from the image formation data when the second projection timings indicate that the display period of the particular second image is less than the threshold time.

20. The non-transitory computer readable medium according to claim 15, wherein the computer is further caused to:
   generate, when the particular first image is repeatedly displayed, the image formation data to include a single copy of the particular first image; and
   generate, when the particular second image is repeatedly displayed, the image formation data to include a single copy of the particular second image.

* * * * *